(12) United States Patent
Brown et al.

(10) Patent No.: US 8,476,480 B1
(45) Date of Patent: Jul. 2, 2013

(54) BIO-OIL FRACTIONATION AND CONDENSATION

(75) Inventors: Robert C. Brown, Ames, IA (US); Samuel T. Jones, Ames, IA (US); Anthony Pollard, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 793 days.

(21) Appl. No.: 12/551,103

(22) Filed: Aug. 31, 2009

Related U.S. Application Data

(60) Provisional application No. 61/093,045, filed on Aug. 29, 2008.

(51) Int. Cl.
*C07C 1/00* (2006.01)
*C10B 47/00* (2006.01)

(52) U.S. Cl.
USPC .............. 585/240; 585/242; 201/12; 201/21; 201/23; 201/25

(58) Field of Classification Search
USPC ..... 585/240, 242; 201/12, 21, 23, 25; 44/605, 44/606, 607
See application file for complete search history.

(56) References Cited

U.S. PATENT DOCUMENTS

| | | | | |
|---|---|---|---|---|
| 4,942,269 A * | 7/1990 | Chum et al. | .................. | 585/240 |
| 5,605,551 A * | 2/1997 | Scott et al. | ....................... | 44/307 |
| 5,792,340 A | 8/1998 | Freel et al. | | |
| 6,244,198 B1 * | 6/2001 | Suominen | ..................... | 110/342 |
| 6,844,420 B1 | 1/2005 | Freel et al. | | |
| 7,905,990 B2 * | 3/2011 | Freel | .............................. | 201/12 |
| 7,956,224 B2 | 6/2011 | Elliott et al. | | |
| 8,043,391 B2 * | 10/2011 | Dinjus et al. | ................. | 48/197 R |
| 8,100,990 B2 * | 1/2012 | Ellens et al. | ..................... | 44/589 |
| 2004/0111968 A1 | 6/2004 | Day et al. | | |
| 2005/0039599 A1 | 2/2005 | Johnson et al. | | |
| 2008/0006519 A1 | 1/2008 | Badger | | |
| 2008/0264771 A1 | 10/2008 | Dam-Johansen et al. | | |
| 2010/0223839 A1 | 9/2010 | Garcia-Perez et al. | | |

(Continued)

FOREIGN PATENT DOCUMENTS

| | | | |
|---|---|---|---|
| WO | WO 2008/136552 | * | 11/2008 |
| WO | 2011041756 A2 | | 4/2011 |
| WO | 2012158651 A2 | | 11/2012 |

OTHER PUBLICATIONS

Mohan et al., "Pyrolysis of Wood/Biomass for Bio-oil: A Critical Review," Energy & Fuels 20:848-889 (2006).

(Continued)

*Primary Examiner* — Nina Bhat
(74) *Attorney, Agent, or Firm* — LeClairRyan, a Professional Corporation

(57) ABSTRACT

A method of fractionating bio-oil vapors which involves providing bio-oil vapors comprising bio-oil constituents is described. The bio-oil vapors are cooled in a first stage which comprises a condenser having passages for the bio-oil separated by a heat conducting wall from passages for a coolant. The coolant in the condenser of the first stage is maintained at a substantially constant temperature, set at a temperature in the range of 75 to 100° C., to condense a first liquid fraction of liquefied bio-oil constituents in the condenser of the first stage. The first liquid fraction of liquified bio-oil constituents from the condenser in the first stage is collected. Also described are steps for subsequently recovering further liquid fractions of liquefied bio-oil constituents. Particular compositions of bio-oil condensation products are also described.

22 Claims, 13 Drawing Sheets

U.S. PATENT DOCUMENTS

2010/0275817 A1 11/2010 Williams et al.
2011/0294927 A1 12/2011 Williams et al.
2012/0090221 A1 4/2012 Banasiak et al.

OTHER PUBLICATIONS

Perlack et al., "Biomass as feedstock for a bioenergy and bioproducts industry: The technical feasibility of a billion-ton annual supply," USDA-DOE (2005).

Anex et al., "Techno-economic comparison of biomass-to-transportation fuels via pyrolysis, gasification, and biochemical pathways," Fuel, 89: S29-S35 (2010).

Bridgewater, "Review of fast pyrolysis of biomass and product upgrading," Biomass and Bioenergy 38:68-94 (2012).

Qi et al., "Review of biomass pyrolysis oil properties and upgrading research," Energy Conversion and Management 48: 87-92 (2007).

Bridgewater, "The production of biofuels and renewable chemicals by fast pyrolysis of biomass," Int. J. Global Energy Issues 27(2):160-203 (2007).

Bridgewater et al., "An overview of fast pyrolysis of biomass," Organic Geochemistry 30:1479-93 (1999).

Bridgewater, "Renewable fuels and chemicals by thermal processing of biomass," Chemical Engineering Journal 91: 87-102 (2003).

\* cited by examiner

BIO-OIL FRACTIONATION AND CONDENSATION

This application claims the benefit of U.S. Provisional Patent Application Ser. No. 61/093,045, filed Aug. 29, 2008, which is hereby incorporated by reference in its entirety.

This invention was made with funding received from the Department of Energy under grant DE-FG36-07-G087003 and the United States Department of Agriculture under grant 68-3A75-5-233. The U.S. government has certain rights in this invention.

FIELD OF THE INVENTION

The present invention relates to bio-oil fractionation and condensation.

BACKGROUND OF THE INVENTION

Biomass, such as forestry and agricultural products and residues, is a major underutilized product in the world. There are several different technologies for converting the biomass to useful energy (e.g., direct burn, co-firing, gasification, and the like) or to biobased products (e.g., fermentation, pyrolysis, and the like), in particular bio-oil. Depending on the type of process used, the final product may have different values and applications. In most cases, these products replace those generated from crude oil, thus having long-term sustainability and environmental benefits (e.g., being carbon neutral).

Fast-pyrolysis oil, also known as bio-oil, is one type of renewable liquid fuel produced from agricultural or forestry residues. Generally speaking, bio-oil has several advantages in terms of energy independence, environmental friendliness, and produce cost. Nonetheless, two main drawbacks of bio-oil limit its usage as high-grade/transportation fuel (Huber et al., "Synthesis of Transportation Fuels from Biomass: Chemistry, Catalysts, and Engineering," *Chem. Rev.* 106(9):4044-4098 (2006); Czernik et al., "Overview of Applications of Biomass Fast Pyrolysis Oil," *Energy Fuels* 18(2):590-598 (2004); Zhang et al., "Review of Biomass Pyrolysis Oil Properties and Upgrading Research," *Energy Convers. Manage.* 48(1):87-92 (2007); and Qasmaa et al., "Fuel Oil Quality of Biomass Pyrolysis Oils—State of the Art for the End User," *Energy Fuels* 13(4):914-921 (1999)). These drawbacks include (1) high acidity (pH of 2-3), which causes the corrosion of instruments, and (2) high oxygen content (35-40 wt. %), which decreases the heating value of bio-oil to only 16-19 MJ/kg, a value much lower than that of traditional petroleum fuels.

The high acidity of bio-oil can be attributed to the large quantities of carboxylic acids found in bio-oil, such as acetic acid, formic acid, and butyric acid (Qasmaa et al., "Fuel Oil Quality of Biomass Pyrolysis Oils—State of the Art for the End User," *Energy Fuels* 13(4):914-921 (1999); Branca et al., "CG/MS Characterization of Liquids Generated from Low-Temperature Pyrolysis of Wood," *Ind. Eng. Chem. Res.* 42(14):3190-3202 (2003); Qasmaa et al., "Fast Pyrolysis of Forestry Residue. 2. Physicochemical Composition of Product Liquid," *Energy Fuels* 17(2):433-443 (2003)). For instance, the bio-oil made from cornstalks has a high content of acetic acid (more than 27% based on gas chromatographic-mass spectrometric (GC-MS) analysis) (Zhu et al., "Analyses and Properties of Pyrolytic Bio-Oil from Cornstralk," *J. Univ. Sci. Technol. China* 36(4):374-377 (2006)). When AL-MCM-41 is added to biomass as pyrolysis catalyst, the yield of acetic acid can be raised 2-fold (Adam et al., "Pyrolysis of Biomass in the Presence of AL-MCM-41 Type Catalysts," *Fuel* 84(12-13):1494-1502 (2005)). On the other hand, bio-oil subjected to fractionation with water (Scholze et al., "Characterization of the Water-Insoluble Fraction from Pyrolysis Oil (Pyrolytic Lignin). Part I. PY-GC/MS, FTIR, and Functional Groups," *J. Anal. Appl. Pyrol.* 60(1):41-54 (2001); Sharma et al., "Catalytic Upgrading of Pyrolysis Oil," *Energy Fuels* 7(2):306-314 (1993)) or ethyl acetate (U.S. Pat. No. 4,942,269 to Chum et al.) will generate two phases, one of which is also composed of a large amount of carboxylic acids. Furthermore, the carboxylic group is the most oxygen-abundant functional group in bio-oil. The existence of carboxylic acids in bio-oil will lead to the consumption of a large amount of hydrogen during hydrotreatment. A higher temperature is also required for the hydrotreatment, because carboxylic acid is more difficult to hydrogenate as compared with aldehydes, ketones, and alcohols (Elliott, D. C., "Historical Developments in Hydroprocessing Bio-Oils," *Energy Fuels* 21(3):1792-1815 (2007)).

Bio-oil is a mixture of water, light volatiles, and non-volatiles and is highly reactive because of the presence of significant quantities of oxygen. Therefore, the common method of distillation (as performed with crude oil) for separation of fractions is not effective. During distillation, the oils start boiling below 100° C., accompanied by numerous polymerization reactions, and distillation stops around 250 to 280° C., leaving as much as 50% of the starting material as residue.

The ability to cool the bio-oil from process temperatures around 450° C. or higher and simultaneously fractionate it would yield a variety of useful products. It is known from previous experience that slow condensation (e.g., condensation that takes place over a time period greater than 2 seconds) can result in reactions between compounds, thus increasing the tar fraction of the condensed bio-oil. In addition, using condensation coils provides surfaces on which tar could deposit and further enhance (catalyze) tar formation.

Commercial bio-oil condensers currently in use are designed to rapidly cool the bio-oil vapors produced during bio-mass pyrolysis to prevent secondary reactions from occurring that convert the vapors into undesired lower molecular weight compounds, char, and gaseous products. Most of the existing bio-oil systems employed commercially are based on single stage spray quenching. The single stage condensers use a single vessel for direct contact heat exchange between gases, vapors and aerosols entering from the pyrolyzer and a spray of cold liquid bio-oil or hydrocarbon. The pyrolysis products are quickly cooled by the cold spray causing vapors to condense. Aerosols produced by this process are washed out of the gas stream by the spray droplets and collected as liquid at the bottom of the tank. Some lab-scale systems attempt to employ multistage condensers. These systems use several vessels in series to cool the bio-oil vapors in stages where the condensed bio-oils are either collected in a single common tank or in individual tanks. Both of these condensing systems are typically optimized to condense the bio-oil vapors as quickly as possible using a low temperature coolant (<20° C.) where little thought is given to how the phases are collected. Previous attempts to optimize these lab-scale multistage condensing systems to fractionate the bio-oil have fared poorly due to the use of this low temperature coolant which causes the high boiling point compounds to congeal and solidify on the walls of the condenser tubes where they are subsequently converted into char which over time leads to char buildup eventual blockage of the condenser tubes. Therefore, there is a need in the industry for an alternate method of condensing the bio-oil.

The present invention is directed to overcoming these and other deficiencies in the art.

SUMMARY OF THE INVENTION

A first aspect of the present invention relates to a method of fractionating bio-oil vapors which involves providing bio-oil vapors comprising bio-oil constituents. The bio-oil vapors are cooled in a first stage which comprises a condenser having passages for the bio-oil separated by a heat conducting wall from passages for a coolant. The coolant in the condenser of the first stage is maintained at a substantially constant temperature, set at a temperature in the range of 75 to 100° C., to condense a first liquid fraction of liquefied bio-oil constituents in the condenser of the first stage. The first liquid fraction of liquified bio-oil constituents from the condenser in the first stage is collected.

The method further involves recovering a first bio-oil vapor fraction from the condenser of the first stage and removing aerosols from the first bio-oil vapor fraction in a second stage as a second liquid fraction of liquified bio-oil constituents.

The method further involves recovering a second bio-oil vapor fraction after the removal of aerosols in the second stage. The second bio-oil vapor fraction is cooled in a third stage which comprises a condenser having passages for the second bio-oil vapor fraction separated by a heat conducting wall from passages for a coolant. The coolant in the condenser of the third stage is maintained at a substantially constant temperature, set at a temperature above the dew point of water, to condense a third liquid fraction of liquefied bio-oil constituents in the condenser of the third stage. The third liquid fraction of liquified bio-oil constituents from the condenser in the third stage is collected.

The method further involves recovering a third bio-oil vapor fraction from the condenser of the third stage and removing aerosols from the third bio-oil vapor fraction in a fourth stage as a fourth liquid fraction of liquified bio-oil constituents.

The method further involves recovering a fourth bio-oil vapor fraction after the removal of aerosols in the fourth stage from the third bio-oil vapor fraction. The fourth bio-oil vapor fraction is cooled in a condenser of a fifth stage having passages for the fourth bio-oil vapor fraction separated by a heat conducting wall from passages for a coolant. The coolant in the condenser of the fifth stage is maintained at a substantially constant temperature, with a temperature set sufficiently low to condense substantially all water vapors from the fourth bio-oil vapor as a fifth liquid fraction of liquefied bio-oil constituents in the condenser of the fifth stage. The fifth liquid fraction of liquified bio-oil constituents from the condenser in the fifth stage is collected.

Another aspect of the present invention relates to a bio-oil condensation product composition comprising furans having a weight percentage in the range of 2 to 7%; minor carbohydrates having a weight percentage in the range of 0 to less than 5%; acetic acid having a weight percentage in the range of 0 to less than 4%; levoglucosan having a weight percentage in the range of 5 to 15%; water insoluble compounds having a weight percentage in the range of 50 to 75%; water having a weight percentage in the range of 3 to 7%; syringols having a weight percentage in the range of 0 to less than 5%; guaiacols having a weight percentage in the range of 3 to 7%; and phenols having a weight percentage in the range of 5 to 10%.

A further aspect of the present invention relates to a bio-oil condensation product composition comprising furans having a weight percentage in the range of 6 to 12%; minor carbohydrates having a weight percentage in the range of 10 to 20%; acetic acid having a weight percentage in the range of 0 to less than 5%; levoglucosan having a weight percentage in the range of 0 to less than 4%; water insoluble compounds having a weight percentage in the range of 10 to 20%; water having a weight percentage in the range of 5 to 15%; syringols having a weight percentage in the range of 3 to 10%; guaiacols having a weight percentage in the range of 7 to 15%; and phenols having a weight percentage in the range of 10 to 18%.

Another aspect of the present invention relates to a bio-oil condensation product composition comprising furans having a weight percentage in the range of 6 to 12%; minor carbohydrates having a weight percentage in the range of 10 to 20%; acetic acid having a weight percentage in the range of 5 to 15%; levoglucosan having a weight percentage in the range of 0 to less than 4%; water insoluble compounds having a weight percentage in the range of 10 to 25%; water having a weight percentage in the range of 5 to 20%; syringols having a weight percentage in the range of 3 to 10%; guaiacols having a weight percentage in the range of 7 to 15%; and phenols having a weight percentage in the range of 10 to 18%.

A further aspect of the present invention relates to a bio-oil condensation product composition comprising furans having a weight percentage in the range of 0 to less than 5%; minor carbohydrates having a weight percentage in the range of 8 to 15%; acetic acid having a weight percentage in the range of 5 to 15%; hydroxyacetaldehyde having a weight percentage in the range of 0 to less than 4%; water insoluble compounds having a weight percentage range of 0 to less than 1%; water having a weight percentage in the range of 56 to 90%; guaiacols having a weight percentage in the range of 0 to less than 3%; and phenols having a weight percentage in the range of 0 to less than 5%.

The method of fractionating according to the present invention will allow for the selective condensation and collection of bio-oil. Oil recovered by conventional means usually contains water and acid which contributes to its poor stability, corrosion during storage, poor combustion performance, and additional cost to upgrade the bio-oil to transportation fuels. The method of the present invention allows water and acid to be separated from the higher molecular weight organic compounds during the oil recovery process, resulting in a much more usable and valuable oil.

The method of the present invention uses a multistage condensing system where each condenser stage has a unique coolant temperature. Individual condenser coolant temperatures are selected such that the bio-oils condensed in each stage do not congeal on the condenser tube walls, preventing unwanted secondary reactions. This is achieved by using a warm coolant instead of a traditionally-used cold coolant. The condensers are also designed to provide a specific cooling capacity so that the bio-oil collected at each condenser only contained bio-oil fractions having a boiling point above the vapor exit temperature of each condenser.

DETAILED DESCRIPTION OF THE INVENTION

Figure 1:
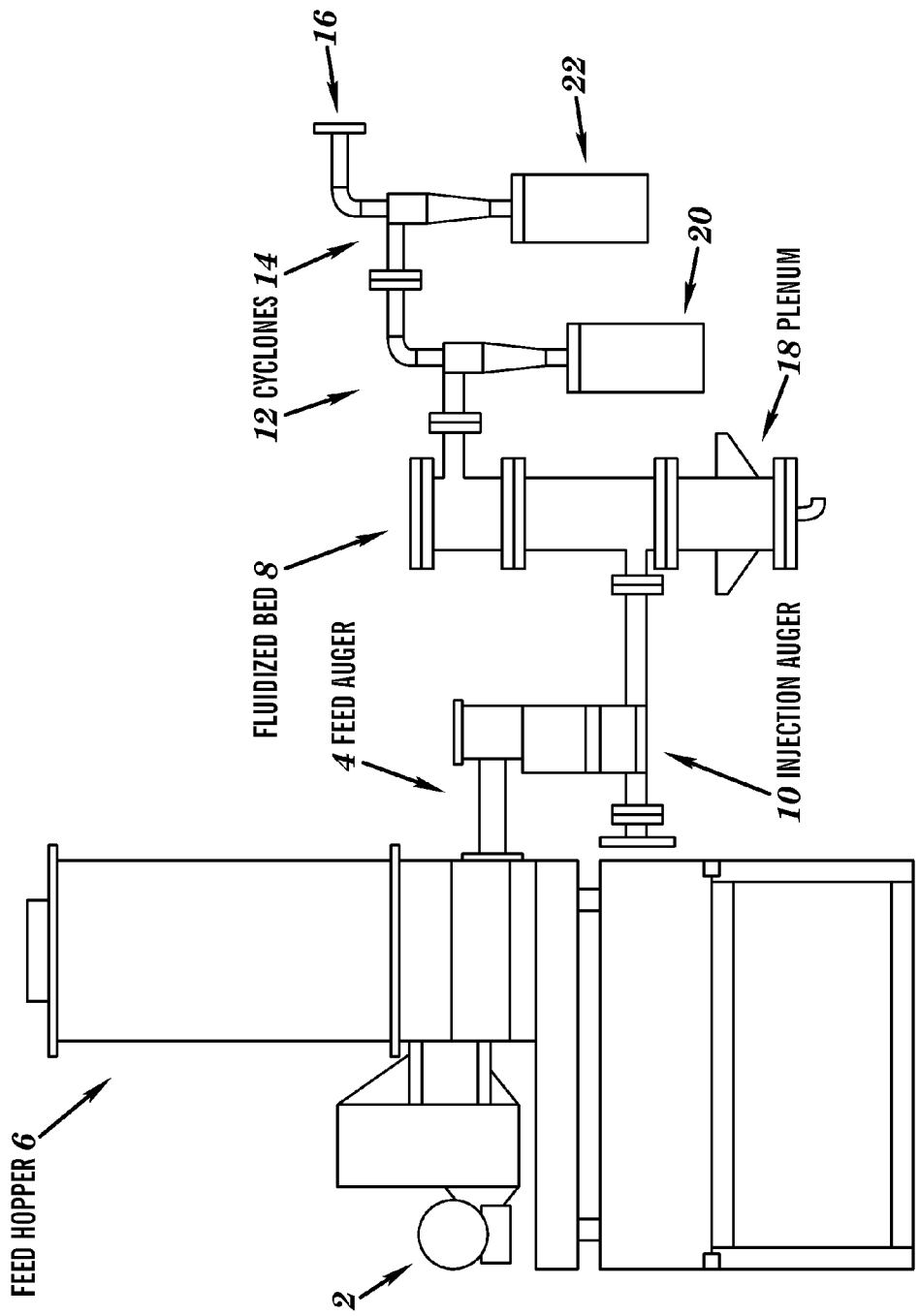
FIG. 1 is a schematic drawing of a bio-oil pyrolyzer apparatus.

FIG. 1 is a schematic drawing of a bio-oil pyrolyzer apparatus. As shown in this figure, biomass in feed hopper 6 is withdrawn by feed auger 4 (powered by motor 2) and fed to injection auger 10. Biomass is charged into fluid bed reactor 8 by injection auger 10, while fluidizing gas is provided through plenum 18. Pyrolysis product gas exiting fluid bed reactor 8 passes through cyclones 12 and 14. Solids removed by the cyclones are collected in containers 20 and 22, while vapors are withdrawn by conduit 16 for recovery of bio-oil liquid fractions as described below.

Biomass can be in the form of products, by-products, and/or residues of the forestry and agriculture industries. Biomass includes, but is not limited to, forest and mill residues, agricultural crops and wastes, wood and wood wastes, animal wastes, livestock operation residues, aquatic plants, fast-growing trees and plants, and municipal and industrial wastes. In particular, biomass can include cellulose, hemicelluose, and/or lignin.

Pyrolysis is the thermal conversion of biomass in the absence of oxygen at temperatures around 350 to 550° C. When treated at these temperatures, biomass decomposes to three primary products, namely, charcoal, bio-oil, and gases (e.g., CO, $H_2$, $CO_2$, and $CH_4$). The product stream entering this bio-oil collection system can be the product of reactions that have occurred in a fast pyrolysis reactor.

Cyclones according to the method of the present invention may serve several purposes, including, preventing the formation of agglomerates, holding the pyrolysis reaction, and removing solid particles from gases through centrifugal or cyclone action. A feed stream comprising a fluid and particles to be separated is injected through the inlet of the cyclone and is forced into a spirally formed path or vortex, along the inner surface of the body. This results in a centrifugal force field, by which particles present in the cyclone are forced in the direction of the inner surface of the cyclone. This centrifugal force field results in separation of fluids and particles.

The fluid bed reactor according to the present invention is used for incineration and/or carbonization of biomass. The fluid bed reactor according to the present invention includes, without limitation, a plurality of air diffuser tubes or plates in the lower section of the reactor body. The upper section of the reactor body is equipped with a sludge feeding unit and a bed make-up material feeding unit. A plenum chamber is disposed below the bed reaction. The sludge is burned while both the sludge and the bed make-up material are fluidized by primary air which is blown through the air diffusers.

Bio-oil is a mixture of water, light volatiles, and non-volatiles and is highly reactive because of the presence of significant quantities of oxygen. At temperatures around 450° C. The bio-oil is a complex mixture of chemical species that result from the decomposition of cellulose, hemicellulose, and lignin. There are over 300 compounds identified that include, but are not limited to, hydroxy-aldehydes, hydroxyketones, sugars, carboxylic acids, and phenolics. The abundance of these chemical species in bio-oil makes it similar to crude petroleum oil, and thus an attractive resource for obtaining chemicals and fuels.

The product stream entering the bio-oil recovery system includes three main components classified by their physical state: non-condensable gases, vapors, and aerosols.

The non-condensable gases include hydrogen, carbon monoxide, carbon dioxide, and light hydrocarbons created during pyrolysis. It may also include inert gases injected into the pyrolyzer to support functions that are independent of the operation of the bio-oil recovery system (although it can affect the optimal operating conditions for the bio-oil recovery system). The non-condensable gases represent 15-20 wt-% of pyrolysis products.

Vapors include water and organic compounds that can be condensed upon cooling the gas stream exiting a pyrolyzer. The organic compounds tend to be of "medium" molecular weight and include carboxylic acids, alcohols, esters and phenolic compounds.

Aerosols are micron and submicron liquid droplets of organic compounds that either have too high a boiling point to evaporate in the pyrolyzer (typically operated around 500° C.) or have condensed from vapor after leaving the reactor because the gas stream has cooled. Aerosols tend to consist of carbohydrates, highly substituted phenolic compounds, and lignin oligomers.

The relative amounts of vapor and aerosol are difficult to ascertain, partly because each can transform depending upon the temperature and nucleation environment. It has been reported that up to 90% of the flow exiting a fluidized pyrolyzer is in the form of aerosols, although this depends upon feedstock and reaction conditions (Fan et al., "Stem Activation of Chars Produced from Oat Hulls and Corn Stover," *Bioresource. Technol.* 93:103-107 (2004) which is hereby incorporated by reference in its entirety). The present invention attempts to exploit the different behavior of vapors and aerosols exiting a pyrolysis reactor in order to collect "stage fractions" that are partitioned according to saturation temperature.

A first aspect of the present invention relates to a method of fractionating bio-oil vapors which involves providing bio-oil vapors comprising bio-oil constituents. The bio-oil vapors are cooled in a first stage which comprises a condenser having passages for the bio-oil separated by a heat conducting wall from passages for a coolant. The coolant in the condenser of the first stage is maintained at a substantially constant temperature, set at a temperature in the range of 75 to 100° C., to condense a first liquid fraction of liquefied bio-oil constituents in the condenser of the first stage. The first liquid fraction of liquified bio-oil constituents from the condenser in the first stage is collected.

The method further involves recovering a first bio-oil vapor fraction from the condenser of the first stage and removing aerosols from the first bio-oil vapor fraction in a second stage as a second liquid fraction of liquified bio-oil constituents.

The method further involves recovering a second bio-oil vapor fraction after the removal of aerosols in the second stage. The second bio-oil vapor fraction is cooled in a third stage which comprises a condenser having passages for the second bio-oil vapor fraction separated by a heat conducting wall from passages for a coolant. The coolant in the condenser of the third stage is maintained at a substantially constant temperature, set at a temperature above the dew point of water, to condense a third liquid fraction of liquefied bio-oil constituents in the condenser of the third stage. The third liquid fraction of liquified bio-oil constituents from the condenser in the third stage is collected.

The method further involves recovering a third bio-oil vapor fraction from the condenser of the third stage and removing aerosols from the third bio-oil vapor fraction in a fourth stage as a fourth liquid fraction of liquified bio-oil constituents.

The method further involves recovering a fourth bio-oil vapor fraction after the removal of aerosols in the fourth stage from the third bio-oil vapor fraction. The fourth bio-oil vapor fraction is cooled in a condenser of a fifth stage having passages for the fourth bio-oil vapor fraction separated by a heat conducting wall from passages for a coolant. The coolant in the condenser of the fifth stage is maintained at a substantially constant temperature, with a temperature set sufficiently low to condense substantially all water vapors from the fourth bio-oil vapor as a fifth liquid fraction of liquefied bio-oil constituents in the condenser of the fifth stage. The fifth liquid fraction of liquified bio-oil constituents from the condenser in the fifth stage is collected.

The method according to the present invention requires the bio-oil vapors passing through the condenser of the first stage to be under laminar flow conditions (i.e. no disruption of layers and no turbulence in the vapors). These particular conditions significantly decrease the chance that aerosol droplets would impact the walls of the condenser; they are instead collected as a fraction in the first condenser. However, the condenser at the third stage can be configured to be operated at a laminar or turbulent flow.

The removal of aerosols according to the present invention in the second and fourth stage is carried out with an electrostatic precipitator and without further cooling of the first bio-oil vapor fraction. The need for additional cooling of the first or third bio-oil vapor fractions is performed by monitoring the temperature of fluids in the electrostatic precipitators.

The method of fractionating according to the present invention also involves injecting a coolant into the bio-oil vapors prior to or upon entry of the bio-oil vapor into the first condenser. This reduces the temperature of bio-oil vapors closer to the condensation temperature in the first condenser. The coolant may be a liquid or gas. An example of such coolant include, without limitation, water.

Figure 2:
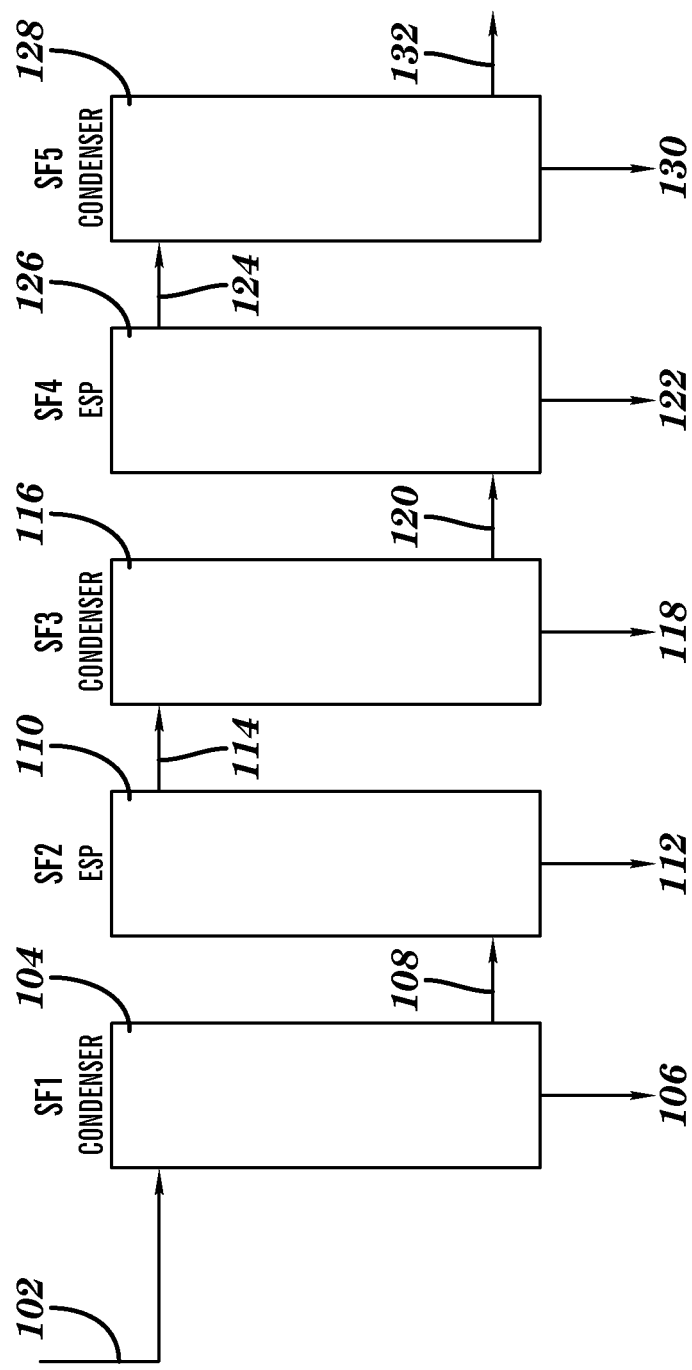
FIG. 2 is a schematic drawing of one embodiment of a fractionating and condensation system according to the present invention.

FIG. 2 is a schematic drawing of one embodiment of a fractionating and condensation system according to the present invention. In this system gas from the pyrolyzer via conduit 102 passes into condenser 104 (SF1) where a first liquid fraction 106 is recovered. Vapors exiting condenser 104 enter electrostatic precipitator (ESP) 110 (SF2). Liquid fraction 112 is recovered from electrostatic precipitator 110 and vapors 114 enter condenser 116 (SF3). In condenser 116, liquid fraction 118 is recovered and vapors 120 pass into electrostatic precipitator 126 (SF4). In electrostatic precipitator 126, liquid fraction 122 is recovered and vapors 124 enter condenser 128 (SF5). Liquid fraction 130 and vapors 132 are recovered from condenser 128. Temperatures at various locations in the system of FIG. 2 are reported in Table 1.

TABLE 1

Temperature Range During the Process Flow.

| Location | Gas Temperature(° C.) | Wall Temperature | Gas Velocity (m/s) | kg bio-oil/kg feed |
|---|---|---|---|---|
| 102 | 500-350 | — | — | — |
| 104 | — | 90-70 | 0.75-0.35 | — |
| 106 | — | — | — | .18-.075 |
| 108 | 170-120 | — | — | — |
| 110 | — | — | — | .225-.075 |
| 112 | — | 170-120 | 0.6-0.275 | — |
| 114 | 170-120 | — | — | — |
| 116 | — | 50-70 | 0.65-0.3 | — |
| 118 | — | — | — | <1 |
| 120 | 100-75 | — | — | — |
| 122 | — | — | — | .12-.025 |
| 124 | — | 100-75 | 0.8-0.5 | — |
| 126 | 100-75 | — | — | — |
| 128 | — | 20-0 | 15-7 | — |
| 130 | — | — | — | .45-.175 |
| 132 | 20-0 | — | — | — |

The condensers of the present invention are devices that are well known in the art. Typically, a liquid-cooled heat exchanger will be appropriate to the method of the present invention. Exemplary condensers include a Liebig condenser, a Graham condenser, a Dimroth condenser, and a spiraled finger condenser.

Figure 8:
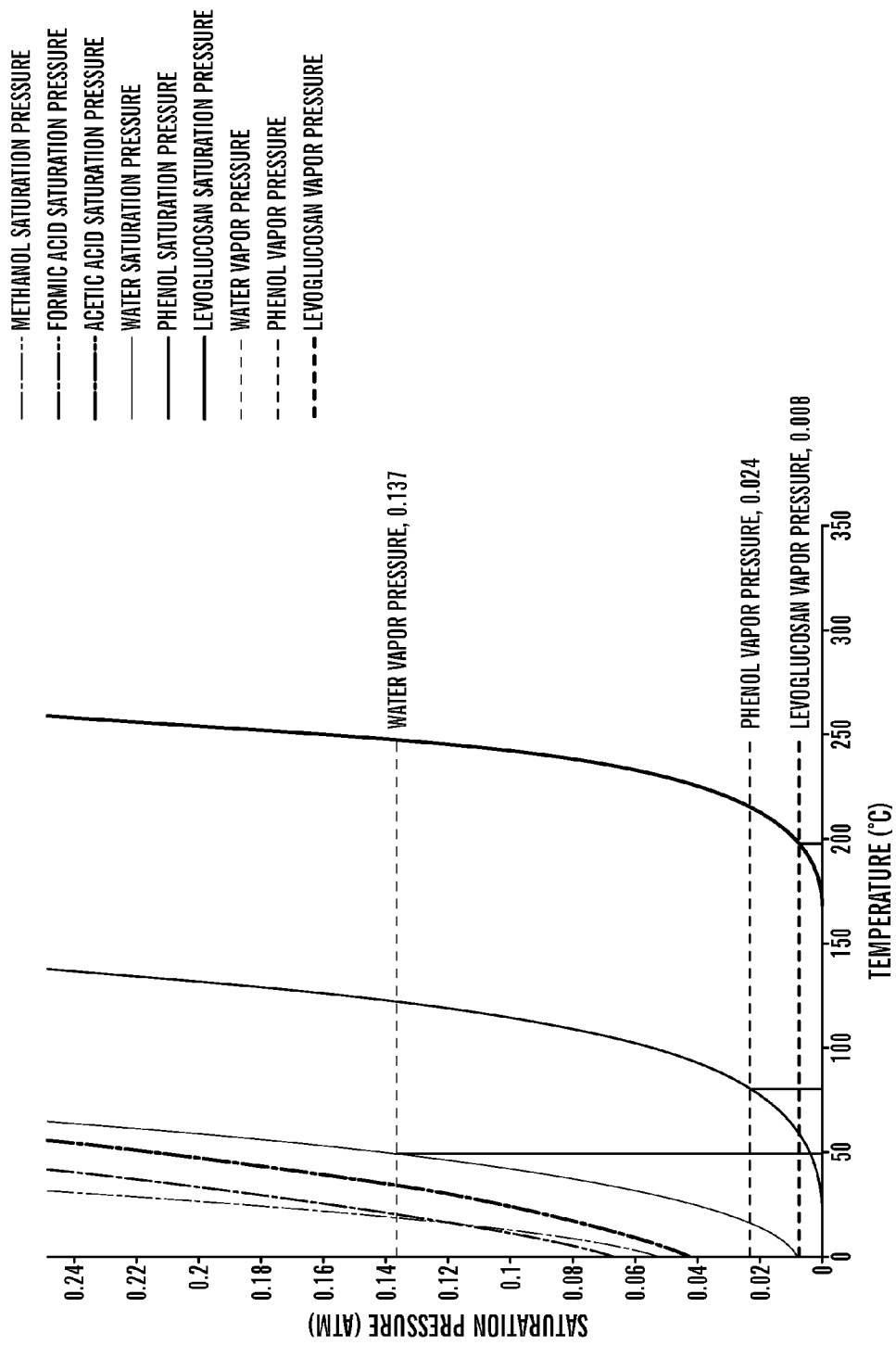
FIG. 8 illustrates plots of saturation pressure vs. temperature for various bio-oil components.

At the inlet of the Stage 1, the product stream ranges from 350-500° C. and the pressure at the inlet is between 5 and 20 inches of water column. The goal of the first condenser is to collect levoglucosan, the most prevalent anhydrosugar in bio-oil, and other high boiling point compounds that exist as vapors in the product stream exiting the pyrolyzer. Levoglucosan and the other high boiling point compounds are challenging to collect using a condenser as they are solid at temperatures below approximately 75° C. Thus, to prevent build up on the condenser walls, the condenser must be operated at temperatures higher than 75° C. If the condenser wall temperature exceeds temperatures greater than approximately 100° C., the condensed vapors begin to thermally decompose to char and non-condensable gases. Hence, the condenser must have a wall temperature between 75 and 90° C. This temperature is just above the saturation temperature of phenol at its calculated partial pressure (FIG. 8). The condenser is designed to operate with a coolant maintained at 75-100° C. and the ability to cool the inlet stream temperature from 350-500° C. to 170-125° C. To significantly decrease the chances that aerosol droplets will impact the condenser walls, laminar flow conditions are preferably utilized.

For an 8 kg/hr process development unit, a shell and tube heat exchanger is utilized to collect the bio-oil in stage 1. The tubes are 1" diameter thin-walled stainless steel tubes and the shell is 14" schedule 40 stainless steel pipe. According to both design calculations and testing, 30 tubes are required to cool the product stream from the 450° C. inlet temperature to the desired outlet temperature of 150° C. The product stream enters through a cone that distributes the vapors evenly to all tubes. The gases flow in a downward direction, pushing the liquid down the tubes to the collection bottle. This downward flow aids the collection of the bio-oil. The downward gas flow also helps to keep the tubes clear by encouraging the bio-oil to flow towards the bottom of the condenser. There is a second cone at the bottom of the condenser that funnels the bio-oil into the collection bottle. The cone has a vapor outlet pipe that exits from the side of the cone.

The vapor stream exits the first stage, at a temperature between 170-125° C., and enters the second stage which is an electrostatic precipitator (ESP). The purpose of the second stage is to collect all of the aerosols present in the vapor product stream from the first condenser without additional vapor condensation. To accomplish this, the second stage is heat traced to prevent the vapor stream cooling. These aerosols contain phenolics, anhydrous sugars, and pyrolytic lignin formed during the pyrolysis process.

The ESP consists of two main components. The pipe that the gas and vapors flow through will act as a ground and collection site for the aerosols. A cylindrical rod that is suspended in the center of the pipe will act as the high voltage (20-40 kV DC) electrode. The high voltage applied to the electrode causes an electrostatic field to be formed between the electrode and the grounding pipe. This field causes a force on any particle (aerosols or particulate) that passes through it. As the particle passes through the field it moves towards the ground wall and thus collects on the wall. These liquids will flow down to the bottom of the ESP to be collected in a bottle. The walls of the ESP will be kept at between 150 and 125° C. to prevent the gases that are passing through the ESP, from cooling before they leave. The ESP only collects the aerosols.

For an 8 kg/hr process development unit, the main pipe of the ESP is a 6" schedule 40 stainless steel pipe. The cylindrical rod has a diameter of 1". The product stream flows upward from the bottom of the ESP to the top. Bio-oil that has collected on the walls flows downward to a cone at the bottom that funnels the bio-oil into the collection bottle.

The condenser of the third stage has the same inlet temperature as both the inlet and outlet of the ESP (between 150 and 125° C.). The liquid products that are obtained from the third stage are the remaining phenolic compounds and any other compounds that have a saturation temperature that is greater than the saturation temperature of water at the partial pressures present at the inlet of the second condenser. The condenser of the third stage was designed much like the condenser of the first stage with the wall temperature of the tubes being determined by the saturation temperature of the undesired component of the bio-oil, in this case water. The saturation temperature of water is approximately 55° C. at the given conditions. The wall temperature of the condenser of the third stage is held between 60 and 70° C. and the flow rate of the water passing through the shell is sufficient to keep a constant temperature on the inner tubes. The condenser of the third stage can be configured for laminar flow but is capable of operating in a turbulent flow regime as well. The desired outlet temperature of the condenser of the third stage is between 75 and 100° C. This outlet temperature will prevent any water from condensing in third stage.

The condenser of third stage of the 8 kg/hr process development unit is designed as a shell and tube heat exchanger in the same manner as the first stage. This stage operates with 24¾" tubes but has the ability of adding or taking tubes away to adjust for different biomasses. The shell for the third stage is constructed from 10" schedule 40 stainless steel pipe.

The fourth stage is another ESP that acts as a final aerosol collection point within the bio-oil collection system. These aerosols could be aerosols that weren't collected in second stage or they could have also been created while the fast pyrolysis vapors were cooled in stage three. Stage four consists of a shell, electrode and power supply. This stage is purely insulated with no heat tracing to prevent condensation. The gases and vapors exit stage four at temperatures between 75 to 100° C.

The ESP of the fourth stage of the process development unit is designed in the same manner as the ESP in the second stage. The fourth fraction consists of an outer pipe and an inner cylindrical rod. The product stream flows upward through the pipe. The collected bio-oil flows downward to the collection bottle. The outer pipe is a 4 inch pipe. The inner cylindrical rod has a diameter of ¼ inches.

Stage five acts as a final stage removal of the remaining compounds. The fifth stage removes the water, alcohols, acids and any other compounds that are still in vapor form when the stream enters this last condenser. The condenser of the fifth stage will have an inlet temperature that ranges from 75 to 100° C. and an outlet temperature that will range between and 0 to 20° C. depending on coolant temperature. Stage five is designed to be a turbulent flow condenser rather than laminar. This is due to the lack of aerosols. The turbulent flow provides for better heat and mass transfer. The goal here is to collect all of the remaining pyrolysis vapors.

The condenser of the fifth stage of the 8 kg/hr process development unit is designed in the same manner as the condenser of the first and third stages. The condenser of the fifth stage contains 8 tubes with an inner diameter of 0.37 inches. The shell is constructed of 4" schedule 40 stainless steel pipe. The shell can be filled with either cool water, chilled water or a chilled mixture of water and glycol (to reach a wall temperature of less than 0° C.). The fifth stage flows in a downward direction that will aid in the collection of the liquids at the bottom of the condenser.

The various bio-oil fractions according to the method of the present invention contain a variety of chemical species including, without limitation, furans, minor carbohydrates, acetic acid, levoglucosan, water insoluble compounds, water, syringols, guaiacols, phenols, hydroxyaldehyde, hydroxyketones, solids, other sugars, and phenolic compounds. These compounds depending on the fraction will be isolated at various concentrations (i.e. various weight percentages).

Figure 3:
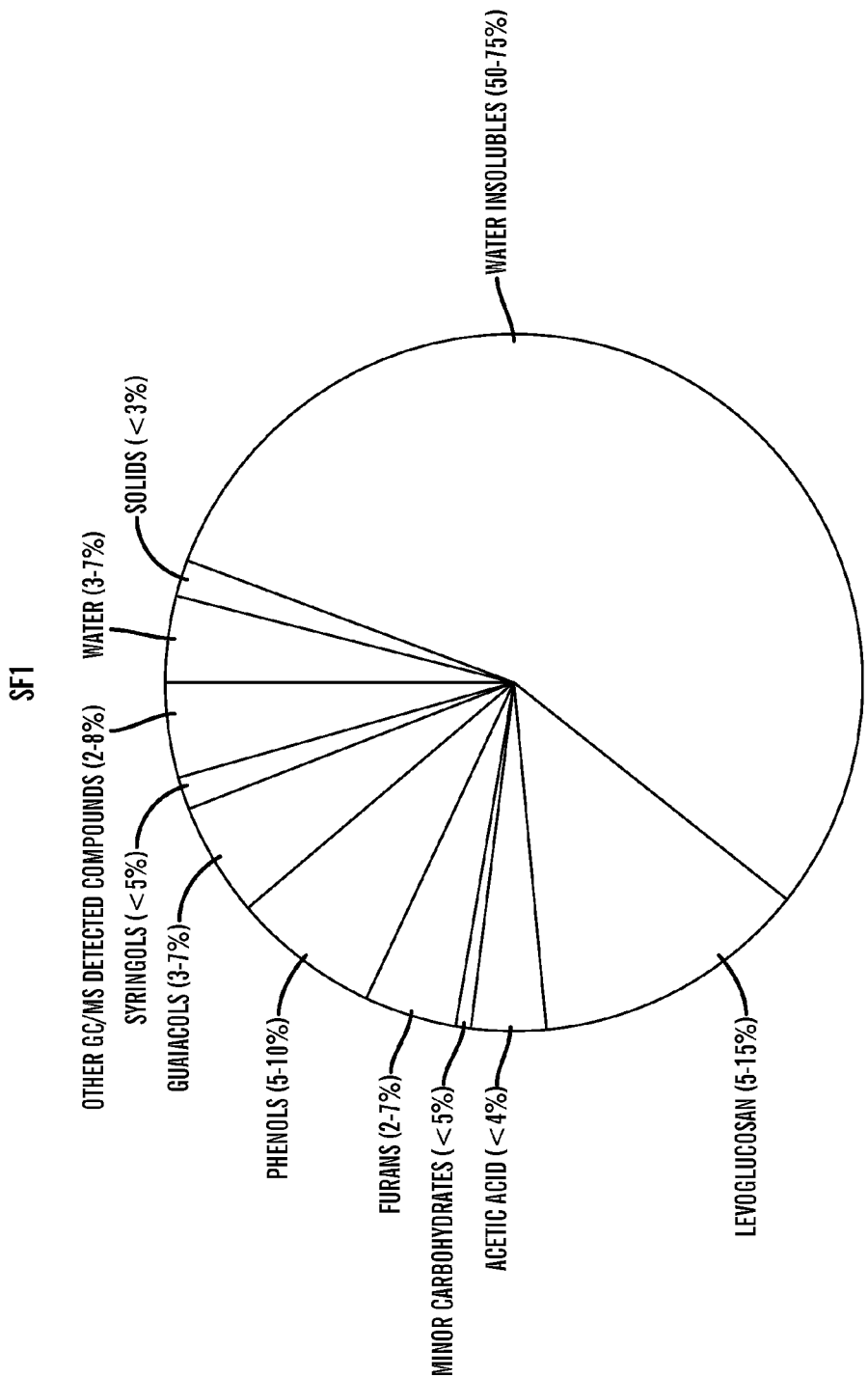
FIG. 3 is a chart of the different bio-oil constituents and their weight percentage ranges contained in the first liquid fraction.

FIG. 3 is a chart of the different bio-oil constituents and their weight percentage ranges contained in the first liquid fraction. The bio-oil collected in the first fraction is high in water insolubles and anhydrosugars. There is also a small amount of water, between 3-7%. The percentage of water insoluble components can range from 50-75% (largely dependent on the biomass that was used). The water insolubles are thought to come from the lignin in the biomass. The first fraction of bio-oil also contains between 5-15% levoglucosan a 6 carbon anhydrous sugar. The amount of levoglucosan is a function of biomass and reactor operating conditions. The bio-oil condensation product composition at the first stage comprises furans having a weight percentage in the range of 2 to 7%; minor carbohydrates having a weight percentage in the range of 0 to less than 5%; acetic acid having a weight percentage in the range of 0 to less than 4%; levoglucosan having a weight percentage in the range of 5 to 15%; water insoluble compounds having a weight percentage in the range of 50 to 75%; water having a weight percentage in the range of 3 to 7%; syringols having a weight percentage in the range of 0 to less than 5%; guaiacols having a weight percentage in the range of 3 to 7%; and phenols having a weight percentage in the range of 5 to 10%.

Figure 4:
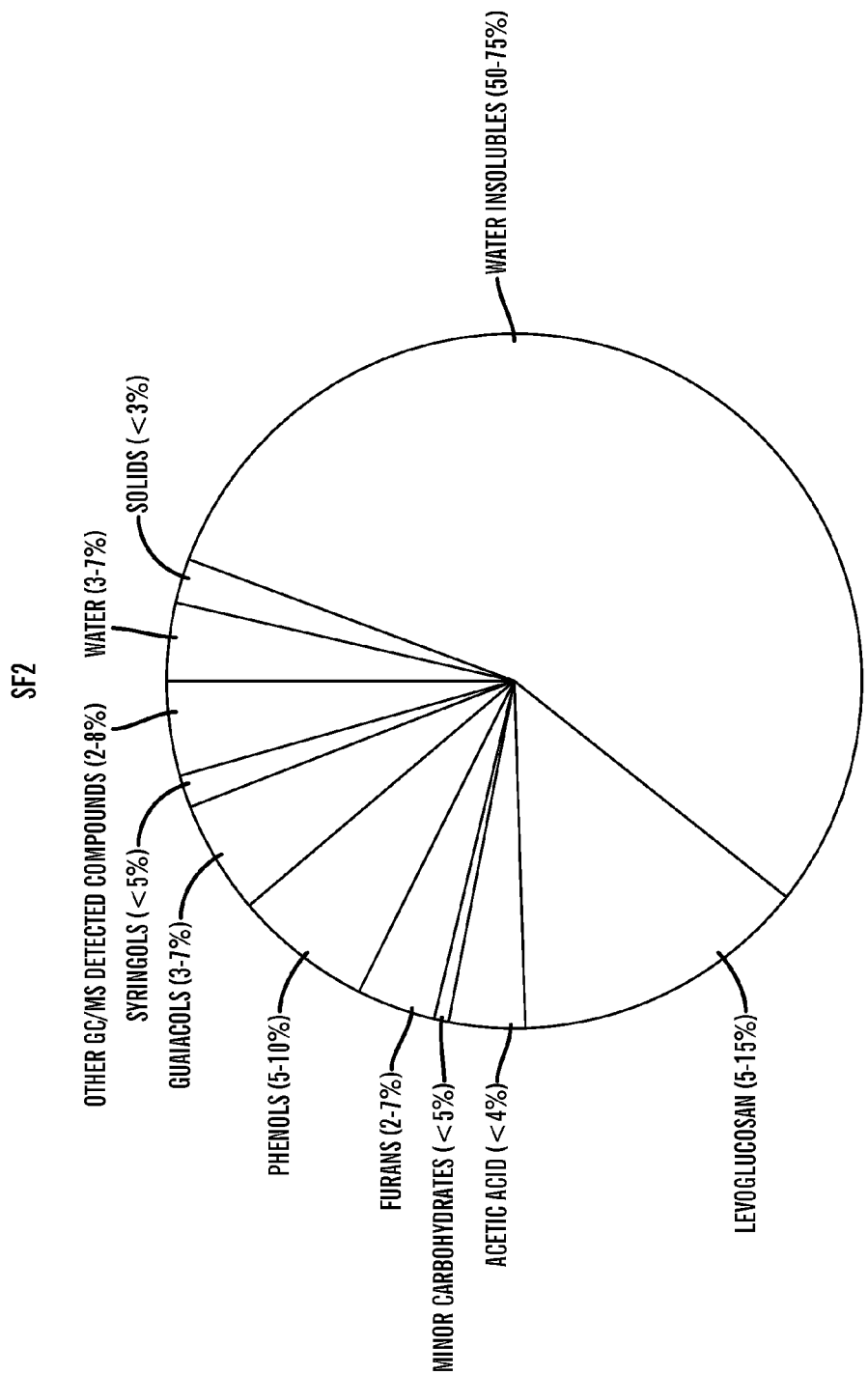
FIG. 4 is a chart of the different bio-oil constituents and their weight percentage ranges contained in the second liquid fraction.

FIG. 4 is a chart of the different bio-oil constituents and their weight percentage ranges contained in the second liquid fraction. The second fraction of bio-oil is very similar to the first fraction (i.e. the bio-oil condensation product composition at the second stage comprises furans having a weight percentage in the range of 2 to 7%; minor carbohydrates having a weight percentage in the range of 0 to less than 5%; acetic acid having a weight percentage in the range of 0 to less than 4%; levoglucosan having a weight percentage in the range of 5 to 15%; water insoluble compounds having a weight percentage in the range of 50 to 75%; water having a weight percentage in the range of 3 to 7%; syringols having a weight percentage in the range of 0 to less than 5%; guaiacols having a weight percentage in the range of 3 to 7%; and phenols having a weight percentage in the range of 5 to 10%).

Figure 5:
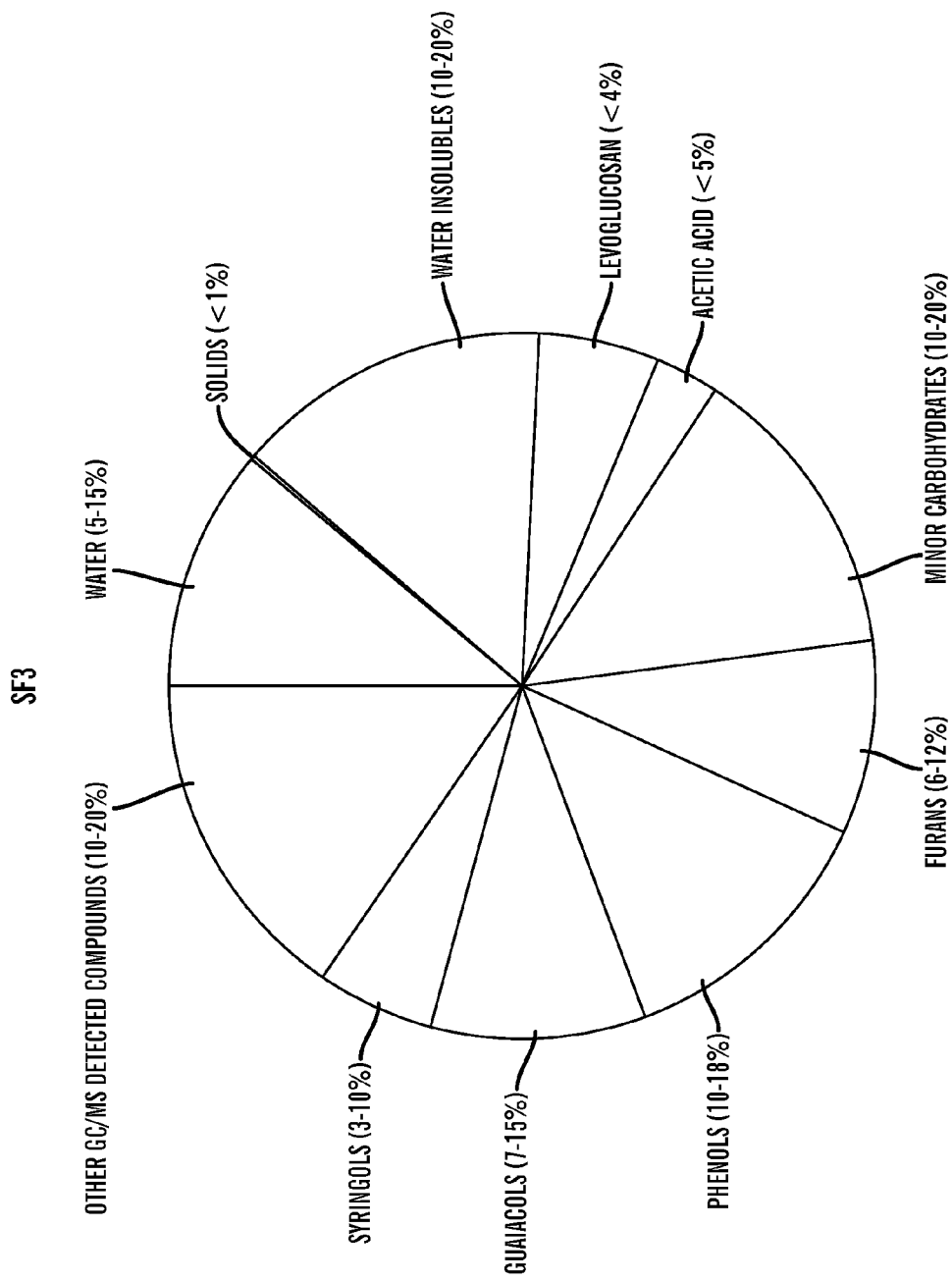
FIG. 5 is a chart of the different bio-oil constituents and their weight percentage ranges contained in the third liquid fraction.

FIG. 5 illustrates a chart of the different bio-oil constituents and their weight percentage ranges contained in the third liquid fraction. The third fraction of bio-oil is a mixture of many different components. The key to the third fraction is the high percentage of phenols. This can be anywhere from 10-18% of this fraction of bio-oil. This fraction has 5-15% water as well. The bio-oil condensation product composition at the third stage comprises furans having a weight percentage in the range of 6 to 12%; minor carbohydrates having a weight percentage in the range of 10 to 20%; acetic acid having a weight percentage in the range of 0 to less than 5%; levoglucosan having a weight percentage in the range of 0 to less than 4%; water insoluble compounds having a weight percentage in the range of 10 to 20%; water having a weight percentage in the range of 5 to 15%; syringols having a weight percentage in the range of 3 to 10%; guaiacols having a weight percentage in the range of 7 to 15%; and phenols having a weight percentage in the range of 10 to 18%.

Figure 6:
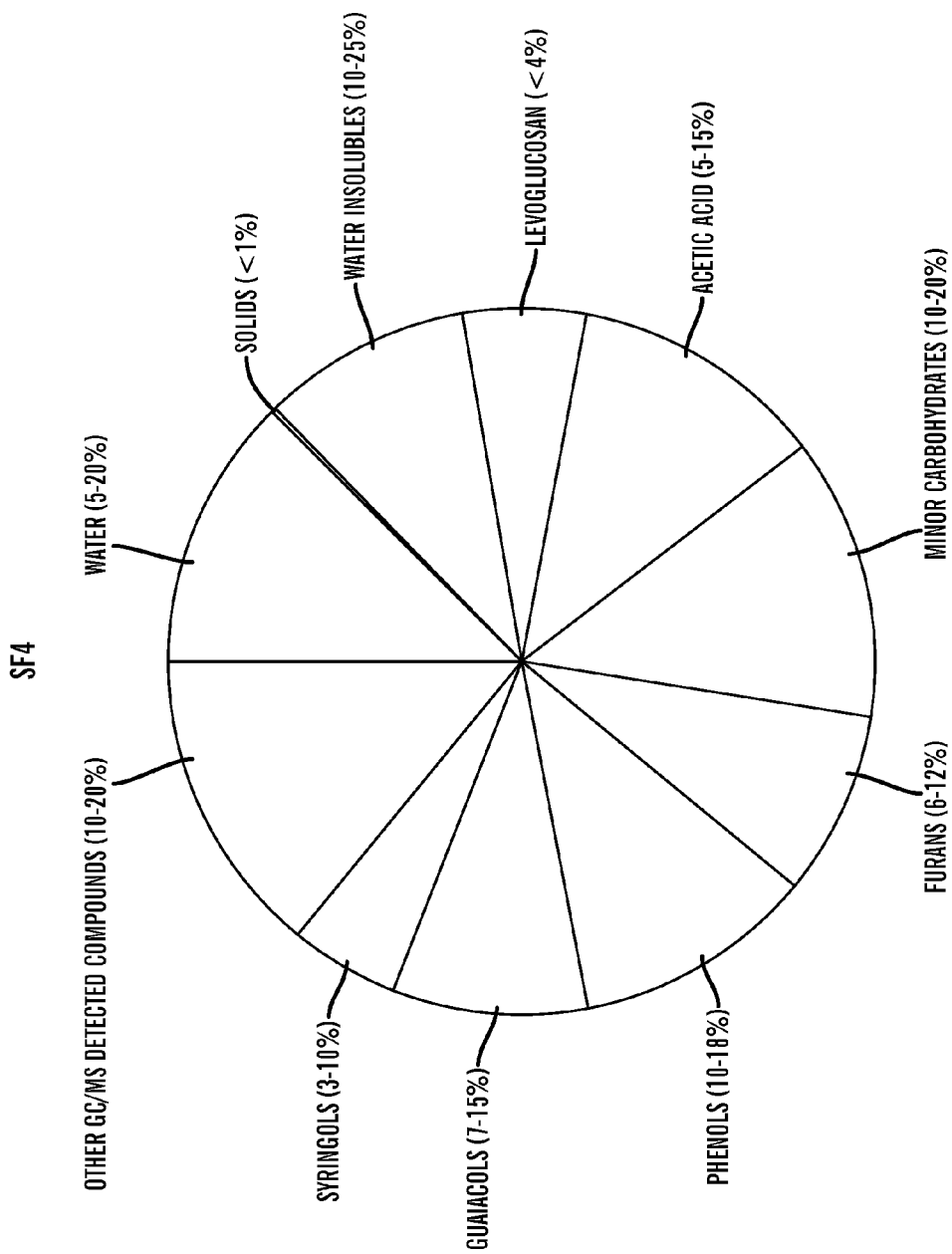
FIG. 6 is a chart of the different bio-oil constituents and their weight percentage ranges contained in the fourth liquid fraction.

FIG. 6 illustrates a chart of the different bio-oil constituents and their weight percentage ranges contained in the fourth liquid fraction. The fourth fraction has a composition that is very similar to the third fraction. There is a high percentage of phenols and acetic acid (5-18%). This fraction can also be between 5-20% water. This fraction will collect mainly low molecular weight compounds and a low percentage of water insoluble compounds. The bio-oil condensation product composition at the fourth stage comprises furans having a weight percentage in the range of 6 to 12%; minor carbohydrates having a weight percentage in the range of 10 to 20%; acetic acid having a weight percentage in the range of 5 to 15%; levoglucosan having a weight percentage in the range of 0 to less than 4%; water insoluble compounds having a weight percentage in the range of 10 to 25%; water having a weight percentage in the range of 5 to 20%; syringols having a weight percentage in the range of 3 to 10%; guaiacols having a weight percentage in the range of 7 to 15%; and phenols having a weight percentage in the range of 10 to 18%.

Figure 7:
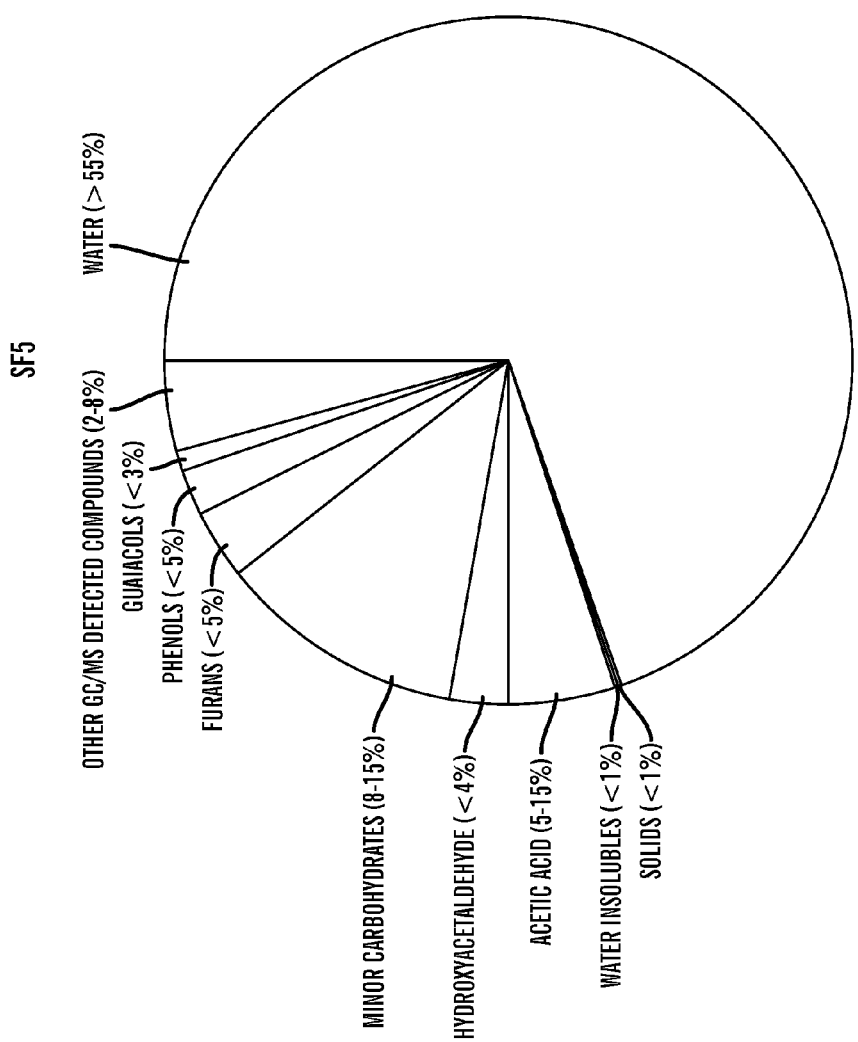
FIG. 7 is a chart of the different bio-oil constituents and their weight percentage ranges obtained in the fifth liquid fraction.

FIG. 7 illustrates a chart of the different bio-oil constituents and their weight percentage ranges obtained in the fifth liquid fraction. The last fraction of bio-oil is a watery fraction that is rich in low molecular weight compounds. This fraction contains more than 55% water and is low in water insolubles and solids (<1% each). This fraction also contains a large amount of acetic acid (5-15%). The bio-oil condensation product composition at the fifth stage comprises furans having a weight percentage in the range of 0 to less than 5%; minor carbohydrates having a weight percentage in the range of 8 to 15%; acetic acid having a weight percentage in the range of 5 to 15%; hydroxyacetaldehyde having a weight percentage in the range of 0 to less than 4%; water insoluble compounds having a weight percentage in the range of 0 to less than 1%; water having a weight percentage in the range of 56 to 90%; guaiacols having a weight percentage in the range of 0 to less than 3%; and phenols having a weight percentage in the range of 0 to less than 5%.

The elemental composition of these liquid fractions is shown in Table 2 as follows:

TABLE 2

Elemental Compositions Analysis of the Different Fractions.

| | SF1 (Condenser) | SF2 (ESP) | SF3 (Condenser) | SF4 (ESP) | SF5 (Condenser) |
|---|---|---|---|---|---|
| Ultimate Analysis | | | | | |
| Carbon | 55-65 | 55-65 | 45-60 | 40-50 | 15-25 |
| Hydrogen | 5-10 | 5-10 | 5-10 | 5-10 | 5-10 |
| Nitrogen | <1% | <1% | <1% | <1% | <1% |
| Sulfur | 0.00 | 0.00 | 0.00 | 0.00 | 0.00 |
| Oxygen (by difference) | 25-40 | 25-40 | 40-50 | 40-60 | 70-80 |
| Ash | <1% | <1% | <1% | <4% | <1% |
| Karl Fischer Analysis (% Moisture) | 3-7% | 3-7% | 5-15% | 5-20% | >55% |
| % Water Insolubles | 50-75% | 50-75% | 10-20% | 10-25% | <1% |
| % Solids | <3% | <3% | <1% | <1% | <1% |
| TAN (mg KOH/gram bio-oil) | 30-40 | 25-50 | 60-75 | 110-130 | 60-160 |
| Higher Heating Value (MJ/kg) | 23-26 | 23-27 | 21-24 | 19-22 | 5-10 |
| Viscosity (cSt) | | | 50-100 (40° C.) | 100-150 (40° C.) | 1-2 (40° C.) |

The composition of the different components within the liquid fractions is set forth in Table 3.

TABLE 3

Product Compositions Analysis of the Different Fractions.

| Major Carbohydrates | Minor Carbohydrates | Furans |
|---|---|---|
| hydroxyacetaldehyde | 3-ethyl-2-hydroxy-2-cyclopentenone | 2-acetylfuran |
| hydroxypropanone | acetoxyacetone | 5-methyl-2-furaldehyde |
| acetic acid | propionic acid | 2-furaldehyde |
| | 2-methyl-2-cyclopentenone | furantetrahydro-2,5-dimethoxy cis |
| levoglucosan | 3-methyl-2-cyclopentenone | furantetrahydro-2,5-dimethoxy trans |
| | 1-hydroxy-2-butanone | furfuryl alcohol |
| | formic acid | 2(5H)-furanone |

| Phenols | Guaiacols | Syringols |
|---|---|---|
| phenol | guaiacol | syringol |
| o-cresol | 4-acetoneguaiacol | syringaldehyde |
| p-cresol | 4-ethylguaiacol | acetosyringone |
| m-cresol | 4-methylguaiacol | 4-methylsyringol |
| 2-methyl-4-propylphenol | isoeugenol cis | |
| 3,4-dimethylphenol | isoeugenol trans | |
| 2,5+2,4-dimethylphenol | eugenol | |
| 2-ethylphenol | vanillin | |
| hydroquinone | | |

| Other GC/MS Detectable Compounds |
|---|
| 1,2-Cyclopentanedione, 3-methyl |
| 2-Propanone, 1-(acetyloxy) |
| 2H-Pyran-2-one |
| Acetol |
| Methanol |

Operation of the bio-oil collection system is based on setting the temperature in each stage fraction to correspond to the saturation temperature of specific compounds that are thought to exist as vapors in the product stream from the pyrolyzer. Compounds will condense from the product gas stream whenever the gas temperature drops below the saturation temperature of the compound in the product gas stream. Saturation temperature, $T_{sat}$, is calculated from the vapor pressure, $P_v$, of the compound in the product gas stream using the Clausius-Clapeyron equation:

$$\ln\left(\frac{P_v}{P_o}\right) = \frac{\Delta H_{vap}}{R}\left(\frac{1}{T_o} - \frac{1}{T_{sat}}\right) \quad \text{Equation 1}$$

where $P_o$ is the saturation pressure corresponding to a standard temperature $T_o$ and $\Delta H_{vap}$ is the enthalpy of vaporization of the compound. The vapor pressure is estimated from the mass fraction of the compound in the bio-oil, $m_f$, and the mass concentration of bio-oil, $C_{oil}$, in the product gas stream using the ideal gas law:

$$P_v = \frac{m_f C_{oil} R_u T_o}{MW} \quad \text{Equation 2}$$

where $R_u$ is the Universal gas constant, $T_o$ is the standard temperature at which the volumetric flow rate of the product gas is determined, and MW is the molecular weight of the compound.

FIG. 8 illustrates a plot of saturation pressure vs. temperature as determined by Equation 1 for several important bio-oil components and vapor pressures (horizontal lines) using Equation 2. The intersection of the saturation pressure curves and vapors pressure lines indicates the temperatures at which the various compounds will condense. For the case shown in FIG. 8, levoglucosan is expected to condense at 200° C., phenol will condense at 80° C., and water will condense at 50° C.

It should also be understood that the present invention contemplates other fractionating and condensation systems.

Figure 9:
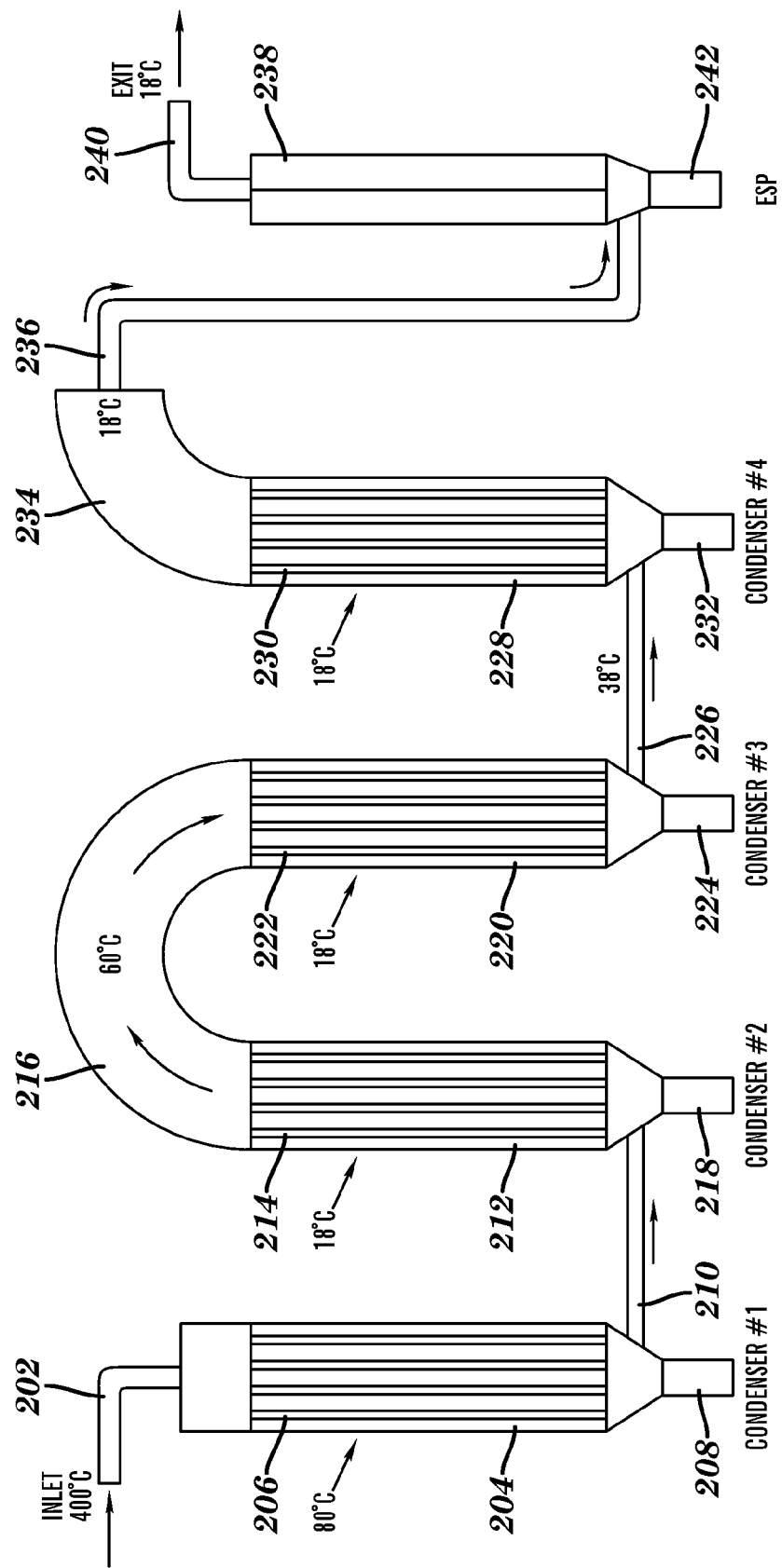
FIG. 9 is a schematic drawing of another embodiment of a fractionating and condensation system according to the present invention.

FIG. 9 is a schematic drawing of an alternate embodiment of fractionating and condensation system in accordance with the present invention. This involves four condensers (204, 212, 220, and 228) arranged in a series with an ESP (238) placed at the end of the series of condensers. Condenser 204 shown in this system is used to collect bio-oil constituents that have boiling points above 150° C. This is accomplished by cooling the bio-oil vapor that enters by inlet 202 at 400° C. using shell and tube (206) type condenser 204 with a cooling media at 80° C. The use of 80° C. cooling media to cool the bio-oil vapor keeps the condenser tubes hot to prevent the high boiling point vapors from adhering to the walls of condenser 204. These materials are collected in the sample bottle 208 at which point they are cooled to room temperature and they become solid. The length, diameter, and number of tubes in condenser 204 are selected such that the existing bio-oil vapors would leave the condenser at 150° C. If the cooling media temperature is under less than 70° C., the high boiling point bio-oils condense and solidify on the walls where they are subsequently decomposed into char like substance that eventually plugs the condenser tubes. Likewise, if the existing bio-oil vapors are not cooled to 150° C., these hot vapors cook the liquid bio-oil between condensers 204 and 212 (i.e. section 210).

Condenser 212 shown in FIG. 9 is also used to collect bio-oil constituents having boiling points greater than 60° C. As in condenser 204, this is again accomplished using shell and tube (214) condenser 212; however, this time the cooling media is at 20° C. The bio-oil condensed in this section is less viscous than that collected in condenser 204. Condenser 212 bio-oil although more viscous than water flows at room temperature. An analysis of this bio-oil sample shows that the bio-oils collected in condenser 212 at collection pot 218 are mostly water soluble compounds with small amounts of levoglucosan and phenolic compounds not removed in condenser 204. Vapors then flow through conduit 216 to condenser 220.

Condenser 220 is used to condense bio-oil compounds not collected in the first two condensers (204 and 212). Condensate in shell and tube (204) condenser 220 is recovered in container 224. Vapors passing from condenser 220 enter shell and tube (230) condenser 228 through conduit 226 where additional condensate is collected in container 232. Condensers 220 and 228 also use a 20° C. cooling media. The bio-oil collected in these condensers is much less viscous than that collected in condenser 212 behaving much like water. An analysis of these bio-oil samples shows that there is not much difference in composition between the samples from condensers 220 and 228. These two samples contained primarily water soluble compounds.

Vapors leaving condenser 228 through passage 234 and conduit 236 enter ESP 238 where the aerosols formed during the pyrolysis and following condensation steps are collected in collector 242. The remaining vapors are withdrawn at conduit 240. ESP 238 is operated at room temperature and collects a bio-oil.

Figure 10:
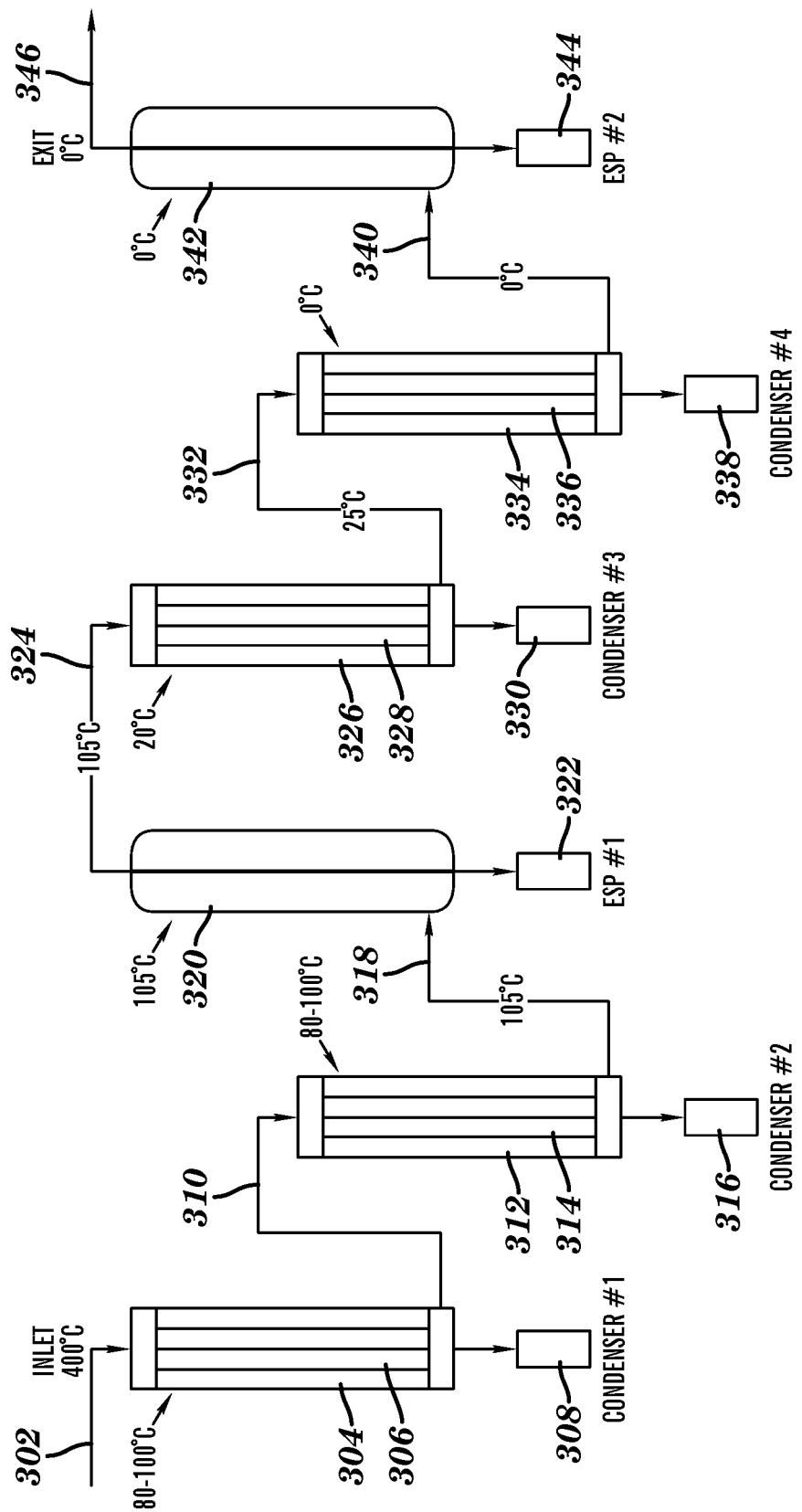
FIG. 10 is a schematic drawing of another embodiment of a fractionating and condensation system according to the present invention.

FIG. 10 is a schematic drawing of an alternate embodiment of fractionating and condensing system in accordance with the present invention. This involves four condensers (304, 312, 326, and 334) and two ESPs (320 and 342) arranged in a series of two adjacent condensers one ESP and two more condensers and one ESP. Condenser 304 shown in this system is used to collect bio-oil constituents that have boiling points above 150° C. This is accomplished by cooling the bio-oil vapor that enters by inlet 302 at 400° C. using shell and tube (306) type condenser 304 with a cooling media between 75° C. and 100° C. The use of 75° C. to 100° C. cooling media to cool the bio-oil vapor keeps the condenser tubes hot to prevent the high boiling point vapors from adhering to the walls of condenser 304. These materials are collected in the sample bottle 308 at which point they are cooled to room temperature and they become solid. The length, diameter, and number of tubes in condenser 304 are selected such that the existing bio-oil vapors would leave the condenser at 150° C. If the cooling media temperature is under less than 70° C., the high boiling point bio-oils condense and solidify on the walls where they are subsequently decomposed into char like substance that eventually plug the condenser tubes. Likewise, if the existing bio-oil vapors are not cooled to 150° C., these hot vapors cook the liquid bio-oil between condensers 304 and 312 (i.e. section 310).

Condenser 312 shown in FIG. 10 is also used to collect bio-oil constituents having boiling points greater than 60° C. As in condenser 304, this is again accomplished using a shell and tube (314) condenser 312. The bio-oil condensed in this section and collected in collector 316 is less viscous than that collected in condenser 304. Condenser 312 bio-oil although more viscous than water flows at room temperature. An analysis of this bio-oil sample shows that the bio-oils collected in condenser 312 are mostly water soluble compounds with small amounts of levoglucosan and phenolic compounds not removed in condenser 304. Vapors then flow through conduit 318 to ESP 320.

ESP 320 is used to remove the levoglucosan and phenolic aerosols not collected in the first two condensers (304 and 312). Condensate in ESP 320 is recovered in container 322. Vapors passing from ESP 320 enter shell and tube (328) condenser 326 through conduit 324 where additional condensate is collected in container 330. Vapors passing from condenser 326 enter shell and tube (336) condenser 334 through conduit 332. The resulting condensate is collected in container 338. Condensers 326 and 334 also use a 20° C. cooling media.

Vapors leaving condenser 334 through passage 340 enter ESP 342 where the aerosols are collected. ESP 342 is operated at a temperature of 0° C. and collects the remaining bio-oil in container 344.

This design has provisions to keep the hot vapors and condensed bio-oil flowing in the same direction in all of the condensers. This solves one of the major problems that cause bio-oil to pool in the tops of condensers 312 and 334. Second, at least one more ESP is included in the system of FIG. 10. This new ESP can be operated at elevated temperatures to collect levoglucosan and phenolic aerosols free of lower boiling point compounds. If lower boiling point compounds are detected in the bio-oil collected in the first ESP, an additional ESP can be added between condensers 304 and 312 in an attempt to collect aerosols without lower boiling point compounds. Third, both condensers 304 and 312 will be operated at elevated temperatures as shown in FIG. 10. The goal is to control the exit temperature on condensers 304 and 312 so that only levoglucosan condenses in condenser 304 and the phenolic compounds condense in condenser 312. Fourth, cold water can be injected into the hot vapors at the entry of condenser 304 to rapidly reduce the vapor temperature from 400° C. to 200° C.

EXAMPLES

The Examples set forth below are for illustrative purposes only and are not intended to limit, in any way, the scope of the present invention.

Example 1

Typical Test Operation

The bio-oil collection system consists of three bio-oil vapor condensers and one or more electrostatic precipitators (which act as aerosol filters), as described in FIG. 2. Each of these components has been designed to collect a specific fraction of the bio-oil. This document provides a detailed description of the design and operation of the bio-oil collection system, referring specifically to the performance of an 8 kg/h process development unit constructed by Iowa State University at the BECON Facility in Nevada, Iowa.

Multiple tests have been completed of the bio-oil collection system. Tests have been completed using red oak, corn stover, and switchgrass. For these tests of the bio-oil collection system, the configuration was as follows: condenser 104 (SF1), ESP 110 (SF2), condenser 116 (SF3), ESP 124 (SF4), condenser 128 (SF5). Below is a detailed description of the operation of the bio-oil collection system during a single test.

Fast pyrolysis vapors, non-condensable gases and fluidization gas from a fluidized bed reactor entered condenser 104 at 354° C. These vapors have passed through a cyclonic filtration system to remove the char from the product stream. The product stream for this test contained 13.03 kg/hr of fluidization gas, 1.81 kg/hr of non-condensible gases and 2.57 kg/hr of bio-oil vapors and aerosols. The tube walls of condenser 104 were held at 90° C. with water pumped at 13 gallons per minute through the shell and tube heat exchanger. Bio-oil was condensed from condenser 104 at a rate of 0.42 kg/hr. The remaining bio-oil vapors and aerosols, fluidization gas and non-condensable gases left condenser 104 at a temperature of 103° C.

The remaining products then entered the hot ESP 110 proceeding upwards through the large pipe. The walls of ESP 110 were held at 125° C. The hot ESP fraction collected 0.60 kg/hr of bio-oil. The remaining product stream exited the hot ESP 110 at 125° C. as it entered the second condenser. The tube walls of condenser 116 were held at 66° C. with water pumped at 13 gallons per minute. Bio-oil was collected at a rate of 0.16 kg/hr from condenser 116. The remaining product steam entered ESP 124 at a temperature of 76° C. The walls of ESP 124 were heavily insulated to prevent condensation and the gas temperature at the exit of ESP 124 was 81° C. A total of 0.26 kg/hr of bio-oil was collected from ESP 124.

The product stream then entered condenser 128 where it was cooled to 20° C. The final condenser had a wall temperature of 16° C. The remaining 1.13 kg/hr of bio-oil was collected in the fifth fraction. The non-condensable gases and the fluidization gas exited the bio-oil collection system for gas analysis.

Example 2

Fractionation of Red Oak

Figure 11:
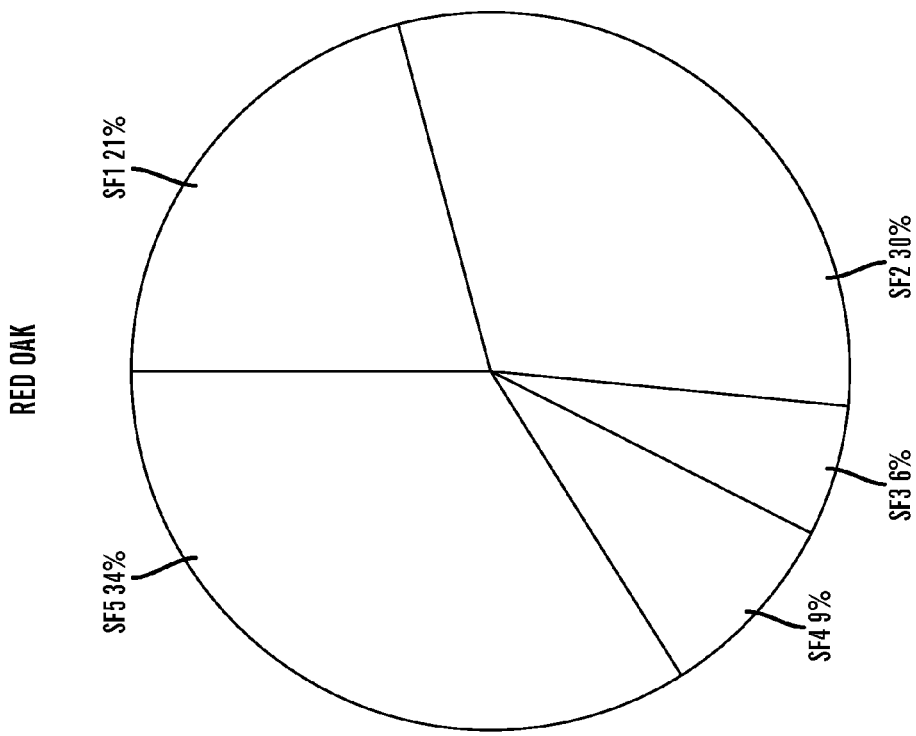
FIG. 11 is a chart of the weight percentages of the different bio-oil liquid fractions obtained from the red oak feedstock.

FIG. 11 is a chart of the weight percentages of the different bio-oil liquid fractions obtained from the red oak feedstock. Fast pyrolysis vapor produces from red oak in the fluid bed reactor entered the condenser 104 at 345° C. After a passage through a cyclonic filtration system to remove char, these bio-oil vapors entered the first condenser tubes. The tubes walls were maintained at a constant temperature of 95° C. This first stage allowed the condensation of 21% of the weight percentage of first liquid fraction. The remaining vapors proceeded through the second stage which was composed of ESP 110. An average temperature of about 102° C. allowed the condensation of a second liquid fraction of 30%. Vapors exited the second stage and entered the third stage at a temperature of 120° C. The tube walls of condenser 116 were maintained at a constant temperature of 66° C. This resulting condensation bio-oil was evaluated at 6% of the third liquid fraction. The non-condensed vapors entered ESP 124 at 77° C., removal of the aerosols and further condensation of the bio-oil afforded 9% of the bio-oil. The remaining vapor entered the third and last condenser at 77° C. The tubes were cooled at 16° C. to allow the condensation of the remaining product in 34% of the fifth liquid fraction (Table 4).

TABLE 4

System Operating Conditions for Red Oak.

| Location | Temperature (° C.) |
|---|---|
| Reactor | 490 |
| SF1 Inlet | 345 |
| SF1 Wall | 95 |
| SF1 Outlet/SF2 Inlet | 102 |
| SF2 Outlet/SF3 Inlet | 129 |
| SF3 Wall | 66 |
| SF3 Outlet/SF4 Inlet | 77 |
| SF4 Outlet/SF5 Inlet | 77 |
| SF5 Wall | 16 |
| SF5 Outlet | 21 |

Example 3

Fractionation of Cornstover

Figure 12:
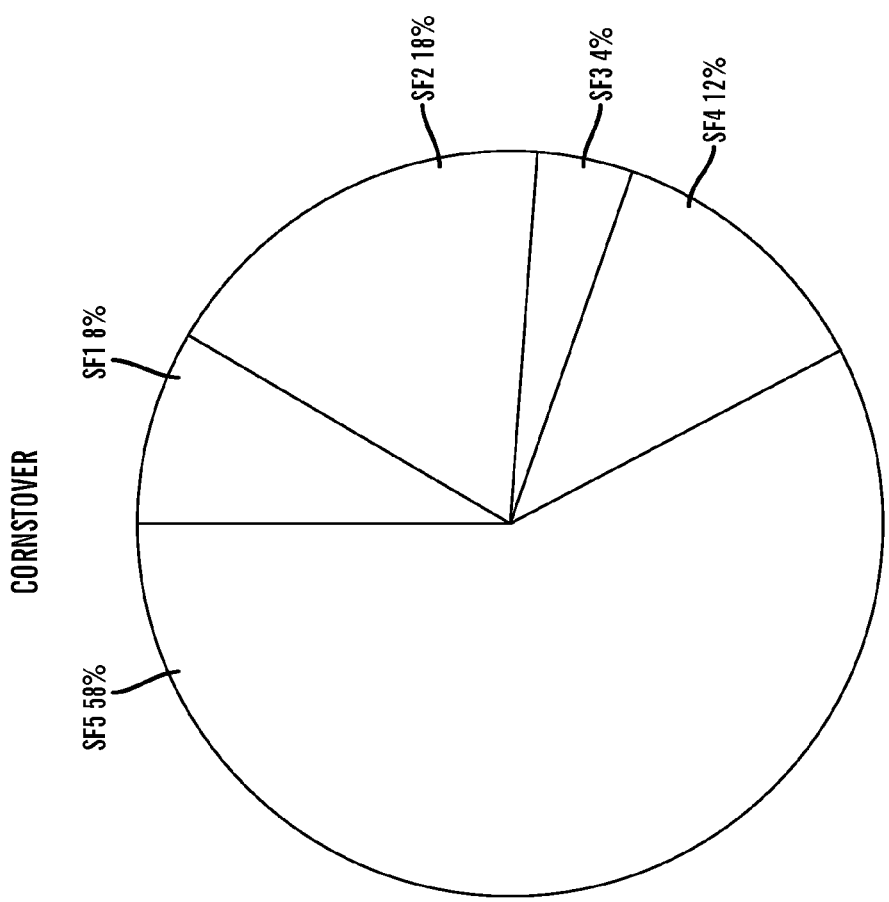
FIG. 12 is a chart of the weight percentages of the different bio-oil liquid fractions obtained from the cornstover feedstock.

FIG. 12 is a chart of the weight percentages of the different bio-oil liquid fractions obtained from the cornstover feedstock. Cornstover was fluidized in a reactor held at 512° C. The resulting vapors entered condenser 104 in which the tubes walls were maintained at 87° C. A first fraction was collected at this stage in 8% of the first liquid bio-oil fraction. The remaining vapors continued into the ESP 110 where the inlet and outlet temperatures were held, respectively, at 82 and 125° C. This second stage afforded 18% of the second liquid fraction. The non-condensed vapors entered condenser 116 where the tubes walls were held at a constant temperature of 67° C., 4% of the third liquid fraction was obtained from the original cornstover feedstock. ESP 124 allowed the collection of 12% of the fourth liquid fraction. The temperatures between the inlet and outlet of the second ESP were, respectively, 76 and 78° C. The last stage of the fractionation involved condenser 128 where the tubes walls were maintained at a constant temperature of 16° C. The remaining vapors afforded a final liquid fraction of 58% of the cornstover (Table 5).

TABLE 5

System Operating Conditions for Cornstover.

| Location | Temperature (° C.) |
| --- | --- |
| Reactor | 512 |
| SF1 Inlet | 270 |
| SF1 Wall | 87 |
| SF1 Outlet/SF2 Inlet | 82 |
| SF2 Outlet/SF3 Inlet | 125 |
| SF3 Wall | 67 |
| SF3 Outlet/SF4 Inlet | 76 |
| SF4 Outlet/SF5 Inlet | 78 |
| SF5 Wall | 16 |

Example 4

Fractionation of Switchgrass

Figure 13:
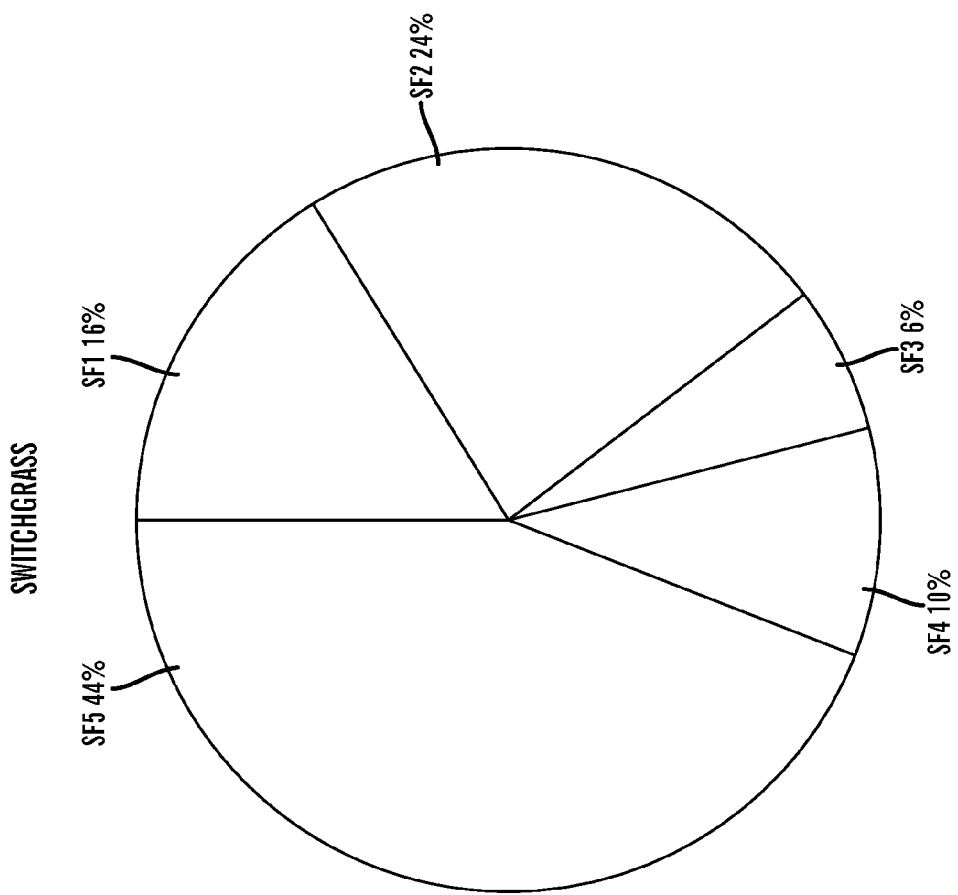
FIG. 13 is a chart of the weight percentages of the different bio-oil liquid fractions obtained from the switchgrass feedstock.

FIG. 13 is a chart of the weight percentages of the different bio-oil liquid fractions obtained from the switchgrass feedstock. A fluid bed reaction was held at a temperature of 500° C. When switchgrass was transferred to the reactor, the resulting vapors of carbonization passed through a filter to remove solid particles such as char. These vapors entered condenser 104 with the tubes walls of 90° C. which afforded 16% of bio-oil product. The non-condensed vapors proceeded to ESP 110 with inlet and outlet temperatures between 102 and 128° C. and gave a second bio-oil fraction of 24% of the original switchgrass. The next stage of the fraction involved condenser 116. The tubes walls of this condenser were maintained at 66° C. This allowed the condensation of 6% of bio-oil product. The remaining vapors in the process continued to ESP 124. The inlet temperature at this stage was 76° C. and the outlet temperature was 81° C. The condensation gave 10% of bio-oil fraction. The last stage was condenser 128 where the tubes walls were held at 16° C. The remaining vapors at this stage were completely condensed to afford 44% of the original switchgrass (Table 6).

TABLE 6

System Operating Conditions for Switchgrass.

| Location | Temperature (° C.) |
| --- | --- |
| Reactor | 500 |
| SF1 Inlet | 354 |
| SF1 Wall | 90 |

TABLE 6-continued

System Operating Conditions for Switchgrass.

| Location | Temperature (° C.) |
| --- | --- |
| SF1 Outlet/SF2 Inlet | 103 |
| SF2 Outlet/SF3 Inlet | 125 |
| SF3 Wall | 66 |
| SF3 Outlet/SF4 Inlet | 76 |
| SF4 Outlet/SF5 Inlet | 81 |
| SF5 Wall | 16 |
| SF5 Outlet | 20 |

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed:

1. A method of fractionating bio-oil vapors, said method comprising:
providing bio-oil vapors comprising bio-oil constituents;
cooling the bio-oil vapors in a first stage comprising a condenser having passages for the bio-oil vapors separated by a heat conducting wall from passages for a coolant, wherein the coolant in the condenser of the first stage is maintained at a substantially constant temperature, set at a temperature in the range of 75 to 100° C., to condense a first liquid fraction of liquefied bio-oil constituents in the condenser of the first stage; and
collecting the first liquid fraction of liquefied bio-oil constituents from the condenser of the first stage.

2. The method of claim 1, wherein the bio-oil vapors pass through the condenser of the first stage under laminar flow conditions.

3. The method of claim 1 further comprising:
recovering a first bio-oil vapor fraction from the condenser of the first stage and
removing aerosols from the first bio-oil vapor fraction in a second stage as second liquid fraction of liquefied bio-oil constituents.

4. The method of claim 3, wherein said removing is carried out without further cooling the first bio-oil vapor fraction.

5. The method of claim 3, wherein said removing is carried out with an electrostatic precipitator.

6. The method of claim 3 further comprising:
recovering a second bio-oil vapor fraction after said removing aerosols;
cooling the second bio-oil vapor fraction in a third stage comprising a condenser having passages for the second bio-oil vapor fraction separated by a heat conducting wall from passages for a coolant, wherein the coolant in the condenser of the third stage is maintained at a substantially constant temperature, set at a temperature above the dew point of water, to condense a third liquid fraction of liquefied bio-oil constituents in the condenser of the third stage; and
collecting the third liquid fraction of liquefied bio-oil constituents from the condenser of the third stage.

7. The method of claim 6 further comprising:
recovering a third bio-oil vapor fraction from the third stage and
removing aerosols from the third bio-oil vapor fraction in a fourth stage as a fourth liquid fraction of liquefied bio-oil constituents.

8. The method of claim 7, wherein said removing aerosols from the third bio-oil vapor fraction is carried out without further cooling the third bio-oil vapor fraction.

9. The method of claim 7, wherein said removing aerosols from the third bio-oil vapor fraction is carried out with an electrostatic precipitator.

10. The method of claim 7 further comprising:
recovering a fourth bio-oil vapor fraction after said removing aerosols from the third bio-oil vapor fraction;
cooling the fourth bio-oil vapor fraction in a condenser of a fifth stage having passages for the fourth bio-oil vapor separated by a heat conducting wall from passages for a coolant, wherein the coolant in the condenser of the fifth stage is maintained at a substantially constant temperature, with a temperature set sufficiently low to condense substantially all water vapor from the fourth bio-oil vapor as a fifth liquid fraction of liquefied bio-oil constituents in the condenser of the fifth stage; and
collecting the fifth liquid fraction of liquefied bio-oil constituents from the condenser of the fifth stage.

11. The method of claim 1, wherein the first liquid fraction comprises: furans having a weight percentage in the range of 2 to 7%, minor carbohydrates having a weight percentage in the range of 0 to less than 5%, acetic acid having a weight percentage in the range of 0 to less than 4%, levoglucosan having a weight percentage in the range of 5 to 15%, water insoluble compounds having a weight percentage in the range of 50 to 75%, water having a weight percentage in the range of 3 to 7%, syringols having a weight percentage in the range of 0 to less than 5%, guaiacols having a weight percentage in the range of 3 to 7%, and phenols having a weight percentage in the range of 5 to 10%.

12. The method of claim 3, wherein the second liquid fraction comprises: furans having a weight percentage in the range of 2 to 7%, minor carbohydrates having a weight percentage in the range of 0 to less than 5%, acetic acid having a weight percentage in the range of 0 to less than 4%, levoglucosan having a weight percentage in the range of 5 to 15%, water insoluble compounds having a weight percentage in the range of 50 to 75%, water having a weight percentage in the range of 3 to 7%, syringols having a weight percentage in the range of 0 to less than 5%, guaiacols having a weight percentage in the range of 3 to 7%, and phenols having a weight percentage in the range of 5 to 10%.

13. The method of claim 6, wherein the third liquid fraction comprises: furans having a weight percentage in the range of 6 to 12%, minor carbohydrates having a weight percentage in the range of 10 to 20%, acetic acid having a weight percentage in the range of 0 to less than 5%, levoglucosan having a weight percentage in the range of 0 to less than 4%, water insoluble compounds having a weight percentage in the range of 10 to 20%, water having a weight percentage in the range of 5 to 15%, syringols having a weight percentage in the range of 3 to 10%, guaiacols having a weight percentage in the range of 7 to 15%, and phenols having a weight percentage in the range of 10 to 18%.

14. The method of claim 7, wherein the fourth liquid fraction comprises: furans having a weight percentage in the range of 6 to 12%, minor carbohydrates having a weight percentage in the range of 10 to 20%, acetic acid having a weight percentage in the range of 0 to less than 5%, levoglucosan having a weight percentage in the range of 0 to less than 4%, water insoluble compounds having a weight percentage in the range of 10 to 25%, water having a weight percentage in the range of 5 to 20%, syringols having a weight percentage in the range of 3 to 10%, guaiacols having a weight percentage in the range of 7 to 15%, and phenols having a weight percentage in the range of 10 to 18%.

15. The method of claim 10, wherein the fifth liquid fraction comprises: furans having a weight percentage in the range of 0 to less than 5%, minor carbohydrates having a weight percentage in the range of 8 to 15%, acetic acid having a weight percentage in the range of 5 to 15%, hydroxyacetaldehyde having a weight percentage in the range of 0 to less than 4%, water insoluble compounds having a weight percentage in the range of 0 to less than 1%, water having a weight percentage in the range of 56 to 90%, guaiacols having a weight percentage in the range of 0 to less than 3%, and phenols having a weight percentage in the range of 0 to less than 5%.

16. The method of claim 1, wherein the condenser of the first stage is a liquid-cooled heat exchanger.

17. The method of claim 6, wherein the condenser of the third stage is a liquid-cooled heat exchanger.

18. The method of claim 10, wherein the condenser of the fifth stage is a liquid-cooled heat exchanger.

19. The method of claim 1, wherein said providing bio-oil vapors comprises:
pyrolyzing biomass and/or solid waste under conditions effective to provide bio-oil vapors.

20. The method of claim 1 further comprising:
injecting a coolant into the bio-oil vapors prior to or upon entry of said bio-oil-vapors into the condenser of the first stage.

21. The method of claim 20, wherein the coolant is a liquid coolant.

22. The method of claim 21, wherein the liquid coolant is water.

* * * * *